(12) United States Patent
Abdelghaffar et al.

(10) Patent No.: US 12,058,070 B2
(45) Date of Patent: Aug. 6, 2024

(54) DYNAMIC MODIFICATION OF SOUNDING PROCEDURE CONFIGURATION

(71) Applicant: Qualcomm Incorporated, San Diego, CA (US)

(72) Inventors: Muhammad Sayed Khairy Abdelghaffar, San Jose, CA (US); Yu Zhang, San Diego, CA (US); Wooseok Nam, San Diego, CA (US); Peter Pui Lok Ang, San Diego, CA (US); Wanshi Chen, San Diego, CA (US)

( * ) Notice: Subject to any disclaimer, the term of this patent is extended or adjusted under 35 U.S.C. 154(b) by 0 days.

(21) Appl. No.: 17/633,508

(22) PCT Filed: Aug. 21, 2020

(86) PCT No.: PCT/CN2020/110513
§ 371 (c)(1),
(2) Date: Feb. 7, 2022

(87) PCT Pub. No.: WO2021/036931
PCT Pub. Date: Mar. 4, 2021

(65) Prior Publication Data
US 2022/0353032 A1    Nov. 3, 2022

(30) Foreign Application Priority Data

Aug. 23, 2019  (WO) ................ PCT/CN2019/102242

(51) Int. Cl.
*H04L 5/00* (2006.01)
*H04B 7/06* (2006.01)

(52) U.S. Cl.
CPC ......... *H04L 5/0048* (2013.01); *H04B 7/0602* (2013.01)

(58) Field of Classification Search
CPC ... H04L 5/0048; H04L 5/0053; H04L 5/0058; H04L 5/0032; H04L 5/003;
(Continued)

(56) References Cited

U.S. PATENT DOCUMENTS 10,405,299 B2   9/2019  Rico et al.
2019/0068260 A1 2/2019  Yan et al.
(Continued)

FOREIGN PATENT DOCUMENTS

CA   3071085 A1 *  1/2019  .......... H04B 7/0602
CN   102355293 A    2/2012
(Continued)

OTHER PUBLICATIONS

Huawei., et al., "Remaining Details of SRS Design", 3GPP Draft; R1-1805959, 3GPP TSG RAN WG1 Meeting #93, 3rd Generation Partnership Project (3GPP), Mobile Competence Centre ; 650, Route Des Lucioles, vol. RAN WG1, No. Busan, Korea; May 21, 2018-May 25, 2018, May 11, 2018, XP051461667, Retrieved from the Internet: URL:http://www.3gpp.org/ftp/tsg%5Fran/WG1%5FRL1/TSGR1%5F93/Docs [retrieved on May 11, 2018], 5 Pages.
(Continued)

*Primary Examiner* — Phong La

(57) ABSTRACT

Methods, systems, and devices for wireless communications are described. A user equipment (UE) may inform a base station of multiple transmission-antenna switching capabilities supported by the UE. The supported transmission-antenna switching capabilities may include a first transmission-antenna switching capability and a second transmission-antenna switching capability. The UE may receive a message that triggers the UE to switch from using a first configuration associated with the first transmission-antenna switching capability to using a second configuration associated with the second transmission-antenna switching capability. The UE may perform a sounding procedure using the second configuration associated with the second transmission-antenna switching capability based on receiving the message.

30 Claims, 17 Drawing Sheets

(58) Field of Classification Search
CPC .. H04B 7/0602; H04B 7/0802; H04B 7/0686; H04B 7/0613; H04B 7/0691; H04B 7/0695
See application file for complete search history.

(56) References Cited

U.S. PATENT DOCUMENTS

| | | | | |
|---|---|---|---|---|
| 2019/0253214 | A1* | 8/2019 | Liu | H04B 7/0604 |
| 2021/0367724 | A1* | 11/2021 | Zhang | H04B 7/0413 |
| 2022/0353032 | A1* | 11/2022 | Abdelghaffar | H04B 7/0689 |

FOREIGN PATENT DOCUMENTS

| | | | | |
|---|---|---|---|---|
| CN | 102771058 | A | | 11/2012 |
| CN | 108632001 | A | | 10/2018 |
| CN | 109690968 | A | | 4/2019 |
| CN | 110050450 | A | | 7/2019 |
| KR | 102504455 | B1 | * | 2/2018 |
| TW | 1793261 | B | * | 2/2019 |
| WO | WO-2017050155 | A1 | | 3/2017 |
| WO | WO-2018052729 | A2 | | 3/2018 |
| WO | WO-2019037158 | A1 | | 2/2019 |
| WO | WO-2020031704 | A1 | * | 2/2020 ........... H04B 7/0602 |
| WO | WO-2020146737 | A1 | * | 7/2020 ........... H04B 7/0626 |

OTHER PUBLICATIONS

International Search Report and Written Opinion—PCT/CN2020/110513—ISA/EPO—Nov. 25, 2020 (194603WO2).
International Search Report and Written Opinion—PCT/CN2019/102242—ISA/EPO—Apr. 24, 2020 (194603WO1).
Qualcomm Incorporated: "SRS Antenna Switching for 1T4R and 2T4R," 3GPP TSG RAN WG1 Meeting #92bis, R1-1804937, Apr. 20, 2018 (Apr. 20, 2018), pp. 1-8, section 2, p. 1-section 5, p. 4.
Huawei., et al., "CR for Reduced SRS Antenna Switching—Solution 2", 3GPP TSG-RAN2 Meeting #107, R2-1911044, 3rd Generation Partnership Project (3GPP), Mobile Competence Centre, 650, Route Des Lucioles, F-06921, Sophia-Antipolis Cedex, France, vol. RAN WG2, No. Prague, Czech Republic, Aug. 26, 2019-Aug. 30, 2019, Aug. 16, 2019, 7 Pages, XP051768806, Section 5.7.4.3.
Huawei., et al., "Further Discussion on the MIMO Layer Adaptation", 3GPP TSG-RAN2 Meeting#107bis, R2-1913789, 3rd Generation Partnership Project (3GPP), Mobile Competence Centre, 650, Route Des Lucioles, F-06921, Sophia-Antipolis Cedex, France, vol. RAN WG2, No. Chongqing, China, Oct. 14, 2019-Oct. 18, 2019, Oct. 4, 2019, 4 Pages, XP051791780, Sections 2, 3, Figure 1.
Supplementary Partial European Search Report—EP20857501—Search Authority—The Hague—Aug. 23, 2023 (194603EP).
Ad-Hoc Chair (Ericsson): "Chairman's notes of AI 6.2.11 Others", 3GPP TSG-RAN WG1 Meeting #92bis, R1-1805432, Sanya, China, Apr. 16-Apr. 20, 2018, 1 Pages.
3GPP TS 38.214, "3rd Generation Partnership Project; Technical Specification Group Radio Access Network; NR; Physical Layer Procedures for Data (Release 15)", 3GPP Standard, Technical Specification, 3GPP TS 38.214, 3rd Generation Partnership Project, Mobile Competence Centre, 650, Route Des Lucioles, F-06921, Sophia-Antipolis Cedex, France, vol. RAN WG1, No. V15.6.0, Jun. 24, 2019, XP051754328, pp. 1-105, Section 5.2, chapter 5.1.5, Section 5.1.2.2, p. 15-p. 16, section 6.2.1.2.
Huawei, et al., "Discussion on reduced SRS antenna switching", 3GPP TSG-RAN2 Meeting#107, R2-1911042, 3rd Generation Partnership Project, Mobile Competence Centre, 650, Route Des Lucioles, F-06921 Sophia-Antipolis Cedex, France, vol. RAN WG2, No. Prague, Czech Republic, Aug. 26, 2019-Aug. 30, 2019, Aug. 16, 2019, 4 Pages, XP051768804, Sections 2,3.
Qualcomm Incorporated: "Maintenance for SRS", 3GPP Draft, 3GPP TSG RAN WG1 Meeting #93, R1-1807349, 3rd Generation Partnership Project (3GPP), Mobile Competence Centre, 650, Route Des Lucioles, F-06921, Sophia-Antipolis Cedex, France, vol. RAN WG1, No. Busan, Korea; May 21, 2018-May 25, 2018, May 20, 2018 (May 20, 2018), XP051442541, 6 Pages, p. 1-p. 4, Sections 3-4, Sections 4, 9.
Supplementary European Search Report—EP20857501—Search Authority—The Hague—Jan. 3, 2024 (194603EP).

* cited by examiner

DYNAMIC MODIFICATION OF SOUNDING PROCEDURE CONFIGURATION

CROSS REFERENCE TO RELATED APPLICATIONS

The present application is a 371 national stage filing of International PCT Application No. PCT/CN2020/110513 by Abdelghaffar et al., entitled "DYNAMIC MODIFICATION OF SOUNDING PROCEDURE CONFIGURATION," filed Aug. 21, 2020; and claims priority to International Patent Application No. PCT/CN2019/102242 by Abdelghaffar et al., entitled "DYNAMIC MODIFICATION OF SOUNDING PROCEDURE CONFIGURATION," filed Aug. 23, 2019, each of which is assigned to the assignee hereof, and each of which is expressly incorporated by reference in its entirety herein.

FIELD OF TECHNOLOGY

The following relates generally to wireless communications and more specifically to dynamic modification of sounding procedure configuration.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some examples, a UE may perform a sounding procedure to assist a base station with channel estimation. But in certain situations, the sounding procedure may result in excess power consumption.

SUMMARY

The described techniques relate to improved methods, systems, devices, and apparatuses that support dynamic modification of sounding procedure configuration. Generally, the described techniques enable a UE to change the configuration it uses to perform a sounding procedure while the UE remains connected to a base station. The UE may provide the base station with multiple transmission-antenna switching capabilities supported by the UE. The UE may then use a configuration associated with one of the capabilities until the base station triggers the UE to change configurations. After changing configurations, the UE may perform a sounding procedure with the base station using the new configuration.

A method of wireless communication at a UE is described. The method may include transmitting an indication of a set of sounding reference signal (SRS) transmission-antenna switching capabilities supported by the UE, the set of SRS transmission-antenna switching capabilities including at least a first SRS transmission-antenna switching capability and a second SRS transmission-antenna switching capability, receiving a message that triggers the UE to switch from using a first configuration associated with the first SRS transmission-antenna switching capability to using a second configuration associated with the second SRS transmission-antenna switching capability, and performing an SRS procedure using the second configuration associated with the second SRS transmission-antenna switching capability based on receiving the message.

An apparatus for wireless communication at a UE is described. The apparatus may include a processor, memory coupled with the processor, and instructions stored in the memory. The instructions may be executable by the processor to cause the apparatus to transmit an indication of a set of SRS transmission-antenna switching capabilities supported by the UE, the set of SRS transmission-antenna switching capabilities including at least a first SRS transmission-antenna switching capability and a second SRS transmission-antenna switching capability, receive a message that triggers the UE to switch from using a first configuration associated with the first SRS transmission-antenna switching capability to using a second configuration associated with the second SRS transmission-antenna switching capability, and perform an SRS procedure using the second configuration associated with the second SRS transmission-antenna switching capability based on receiving the message.

Another apparatus for wireless communication at a UE is described. The apparatus may include means for transmitting an indication of a set of SRS transmission-antenna switching capabilities supported by the UE, the set of SRS transmission-antenna switching capabilities including at least a first SRS transmission-antenna switching capability and a second SRS transmission-antenna switching capability, receiving a message that triggers the UE to switch from using a first configuration associated with the first SRS transmission-antenna switching capability to using a second configuration associated with the second SRS transmission-antenna switching capability, and performing an SRS procedure using the second configuration associated with the second SRS transmission-antenna switching capability based on receiving the message.

A non-transitory computer-readable medium storing code for wireless communication at a UE is described. The code may include instructions executable by a processor to transmit an indication of a set of SRS transmission-antenna switching capabilities supported by the UE, the set of SRS transmission-antenna switching capabilities including at least a first SRS transmission-antenna switching capability and a second SRS transmission-antenna switching capability, receive a message that triggers the UE to switch from using a first configuration associated with the first SRS transmission-antenna switching capability to using a second configuration associated with the second SRS transmission-antenna switching capability, and perform an SRS procedure using the second configuration associated with the second SRS transmission-antenna switching capability based on receiving the message.

Some examples of the method, apparatuses, and non-transitory computer-readable medium described herein may further include operations, features, means, or instructions for receiving, in the message, an indication of a change in a maximum quantity of multiple-input multiple-output (MIMO) layers for downlink signaling, where a field in the message indicates the second SRS transmission-antenna switching capability.

Some examples of the method, apparatuses, and non-transitory computer-readable medium described herein may further include operations, features, means, or instructions for receiving, in response to transmitting the indication of the set of SRS transmission-antenna switching capabilities, an indication of an association between each SRS transmission-antenna switching capability and a bandwidth part (BWP) configured for the UE.

Some examples of the method, apparatuses, and non-transitory computer-readable medium described herein may further include operations, features, means, or instructions for receiving, in the message, an indication that the UE is to change from using a first BWP to a second BWP, where the second SRS transmission-antenna switching capability is associated with the second BWP.

Some examples of the method, apparatuses, and non-transitory computer-readable medium described herein may further include operations, features, means, or instructions for determining a preference at the UE for the second configuration associated with the second SRS transmission-antenna switching, and transmitting an indication of the preference to a base station.

Some examples of the method, apparatuses, and non-transitory computer-readable medium described herein may further include operations, features, means, or instructions for receiving, in response to transmitting the indication of the set of SRS transmission-antenna switching capabilities, an indication of at least a first SRS resource set that is associated with the first configuration and an indication of at least a second SRS resource set that is associated with the second configuration.

Some examples of the method, apparatuses, and non-transitory computer-readable medium described herein may further include operations, features, means, or instructions for refraining from using one or more SRS resources of the at least one SRS resource or refraining from using one or more ports associated with the at least one SRS resource.

Some examples of the method, apparatuses, and non-transitory computer-readable medium described herein may further include operations, features, means, or instructions for receiving, in response to transmitting the indication of the set of SRS transmission-antenna switching capabilities, an indication of an SRS resource set that is associated with the first configuration and the second configuration, and modifying the SRS resource set based on switching from the first configuration to the second configuration.

Some examples of the method, apparatuses, and non-transitory computer-readable medium described herein may further include operations, features, means, or instructions for changing a quantity of SRS resources associated with the SRS resource set or changing a quantity of ports associated with the SRS resources.

Some examples of the method, apparatuses, and non-transitory computer-readable medium described herein may further include operations, features, means, or instructions for identifying a rule for modifying the SRS resource set, where modifying the SRS resource set is based on the identified rule.

Some examples of the method, apparatuses, and non-transitory computer-readable medium described herein may further include operations, features, means, or instructions for receiving a rule for modifying the SRS resource set, where modifying the SRS resource set is based on the received rule.

Some examples of the method, apparatuses, and non-transitory computer-readable medium described herein may further include operations, features, means, or instructions for changing from the first configuration to the second configuration based on the message.

Some examples of the method, apparatuses, and non-transitory computer-readable medium described herein may further include operations, features, means, or instructions for receiving an indication of a period of time the UE is to delay before performing the SRS procedure using the second configuration, and refraining from performing the SRS procedure using the second configuration until the period of time has elapsed.

Some examples of the method, apparatuses, and non-transitory computer-readable medium described herein may further include operations, features, means, or instructions for changing at least one of an activation state of one or more ports, an activation state of one or more antennas, and one or more SRS resources used for the SRS procedure.

Some examples of the method, apparatuses, and non-transitory computer-readable medium described herein may further include operations, features, means, or instructions for maintaining a connection with the base station while the UE changes from the first configuration to the second configuration.

Some examples of the method, apparatuses, and non-transitory computer-readable medium described herein may further include operations, features, means, or instructions for: receiving a first indication of a first period of time the UE is to wait between receiving a trigger to switch from the first configuration to the second configuration and performing a sounding procedure using the second configuration; and receiving a second indication of a second period of time the UE is to wait between receiving a trigger to switch from the second configuration to the first configuration and performing a sounding procedure using the first configuration, where the second period of time is longer than the first period of time.

Some examples of the method, apparatuses, and non-transitory computer-readable medium described herein may further include operations, features, means, or instructions for refraining from performing the SRS procedure using the second configuration until after the first period of time has elapsed, receiving a second message that triggers the UE to switch from the second configuration to the first configuration, and refraining from performing a second SRS procedure using the first configuration until after the second period of time has elapsed.

In some examples of the method, apparatuses, and non-transitory computer-readable medium described herein, the first configuration includes a first quantity of activated is less than the first quantity of activated antennas.

In some examples of the method, apparatuses, and non-transitory computer-readable medium described herein, each SRS transmission-antenna switching capability indicates a first quantity of antennas over which the UE can simultaneously receive and a second quantity of antennas over which the UE can simultaneously transmit.

In some examples of the method, apparatuses, and non-transitory computer-readable medium described herein, the message includes a DCI message or a medium access control (MAC) control element (MAC-CE) message.

A method of wireless communication at a base station is described. The method may include receiving, from a UE, an indication of a set of SRS transmission-antenna switching capabilities supported by the UE, the set of SRS transmission-antenna switching capabilities including at least a first SRS transmission-antenna switching capability and a second SRS transmission-antenna switching capability and transmitting a message to trigger the UE to switch from using a first configuration associated with the first SRS transmission-antenna switching capability to using a second configuration associated with the second SRS transmission-antenna switching capability.

An apparatus for wireless communication at a base station is described. The apparatus may include a processor, memory coupled with the processor, and instructions stored in the memory. The instructions may be executable by the processor to cause the apparatus to receive, from a UE, an indication of a set of SRS transmission-antenna switching capabilities supported by the UE, the set of SRS transmission-antenna switching capabilities including at least a first SRS transmission-antenna switching capability and a second SRS transmission-antenna switching capability and transmit a message to trigger the UE to switch from using a first configuration associated with the first SRS transmission-antenna switching capability to using a second configuration associated with the second SRS transmission-antenna switching capability.

Another apparatus for wireless communication at a base station is described. The apparatus may include means for receiving, from a UE, an indication of a set of SRS transmission-antenna switching capabilities supported by the UE, the set of SRS transmission-antenna switching capabilities including at least a first SRS transmission-antenna switching capability and a second SRS transmission-antenna switching capability and transmitting a message to trigger the UE to switch from using a first configuration associated with the first SRS transmission-antenna switching capability to using a second configuration associated with the second SRS transmission-antenna switching capability.

A non-transitory computer-readable medium storing code for wireless communication at a base station is described. The code may include instructions executable by a processor to receive, from a UE, an indication of a set of SRS transmission-antenna switching capabilities supported by the UE, the set of SRS transmission-antenna switching capabilities including at least a first SRS transmission-antenna switching capability and a second SRS transmission-antenna switching capability and transmit a message to trigger the UE to switch from using a first configuration associated with the first SRS transmission-antenna switching capability to using a second configuration associated with the second SRS transmission-antenna switching capability.

Some examples of the method, apparatuses, and non-transitory computer-readable medium described herein may further include operations, features, means, or instructions for determining to change a maximum quantity of MIMO layers for downlink signaling from a first maximum quantity to a second maximum quantity, and selecting the second SRS transmission-antenna switching capability based on the second maximum quantity of MIMO layers, where the message includes an indication of the change in the maximum quantity of MIMO layers.

Some examples of the method, apparatuses, and non-transitory computer-readable medium described herein may further include operations, features, means, or instructions for determining an association between each SRS transmission-antenna switching capability and a BWP configured for the UE, and transmitting an indication of the association for each SRS switching capability supported by the UE. In some examples of the method, apparatuses, and non-transitory computer-readable medium described herein, the message indicates a BWP configured for the UE.

Some examples of the method, apparatuses, and non-transitory computer-readable medium described herein may further include operations, features, means, or instructions for receiving a second message from the UE indicating that the second SRS transmission-antenna switching capability is preferred by the UE, where the message indicates the second SRS transmission-antenna switching capability.

Some examples of the method, apparatuses, and non-transitory computer-readable medium described herein may further include operations, features, means, or instructions for determining at least one SRS resource set for each SRS transmission-antenna switching capability supported by the UE, and transmitting to the UE an indication of the SRS resource set for each SRS transmission-antenna switching capability.

Some examples of the method, apparatuses, and non-transitory computer-readable medium described herein may further include operations, features, means, or instructions for determining an SRS resource set for the set of SRS transmission-antenna switching capabilities supported by the UE, and transmitting to the UE an indication of the SRS resource set for the set of SRS transmission-antenna switching capabilities supported by the UE.

Some examples of the method, apparatuses, and non-transitory computer-readable medium described herein may further include operations, features, means, or instructions for transmitting an indication of a set of ports and SRS resources to be used with the second SRS transmission-antenna switching capability.

Some examples of the method, apparatuses, and non-transitory computer-readable medium described herein may further include operations, features, means, or instructions for identifying a period of time the UE is to delay before performing an SRS procedure using a configuration associated with the second SRS transmission-antenna switching capability, transmitting an indication of the period of time to the UE, and receiving an SRS from the UE after the period of time has elapsed.

Some examples of the method, apparatuses, and non-transitory computer-readable medium described herein may further include operations, features, means, or instructions for determining a first period of time the UE is to wait between receiving a trigger to switch from the first configuration to the second configuration and performing a sounding procedure using the second configuration, determining a second period of time the UE is to wait between receiving a trigger to switch from the second configuration to the first configuration and performing a sounding procedure using the first configuration, where the second period of time is longer than the first period of time, and transmitting an indication of the first period of time and the second period of time to the UE.

Some examples of the method, apparatuses, and non-transitory computer-readable medium described herein may further include operations, features, means, or instructions for receiving, in response to the message, an SRS from the UE after the first period of time has elapsed, transmitting a second message to trigger the UE to switch from the second configuration to the first configuration, and receiving, in response to the second message, a second SRS from the UE after the second period of time has elapsed.

Some examples of the method, apparatuses, and non-transitory computer-readable medium described herein may further include operations, features, means, or instructions for estimating an uplink channel between the UE and the base station based on an SRS received from the UE and the second SRS transmission-antenna switching capability.

DETAILED DESCRIPTION

Figure 1:
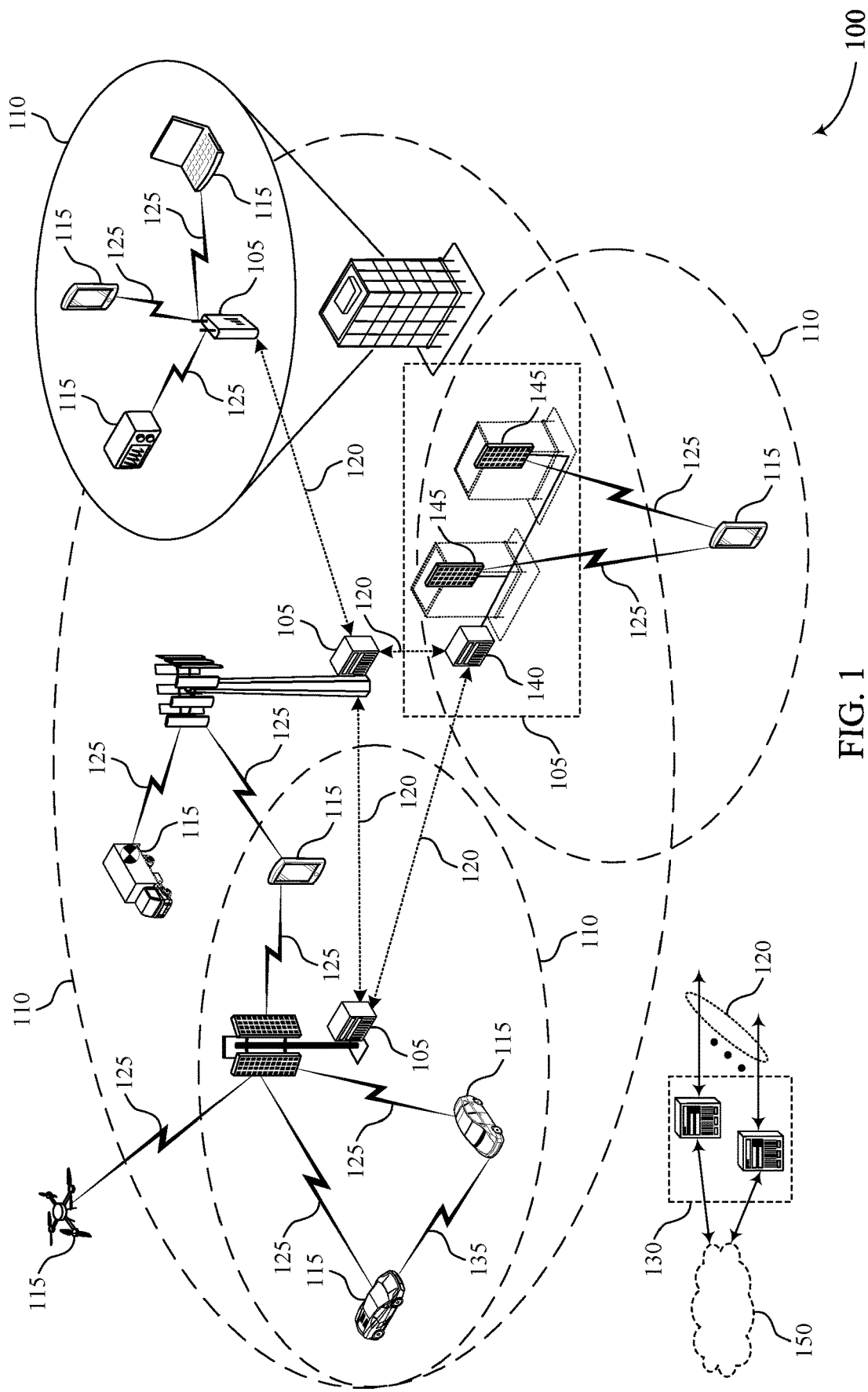
FIG. 1 illustrates an example of a system for wireless communications that supports dynamic modification of sounding procedure configuration in accordance with aspects of the present disclosure.

The ability of a user equipment (UE) to simultaneously transmit over antennas during uplink signaling (e.g., during a sounding procedure, such as a sounding reference signal (SRS) procedure) may be referred to as an SRS transmission-antenna switching capability. A UE in a wireless network may inform its serving base station of multiple SRS transmission-antenna switching capabilities supported by the UE, each of which may be realized or implemented via a configuration of the UE that corresponds to the associated SRS transmission-antenna switching capability. After informing the base station of its capabilities, the UE may use a first configuration associated with a first SRS transmission-antenna switching capability for SRS procedures but change to a second configuration associated with a second SRS transmission-antenna switching capability upon receiving a trigger to do so from the base station. The second configuration may consume less power than the first configuration.

In certain wireless systems, a UE may inform a base station of an SRS transmission-antenna switching capability that the UE intends to use for channel sounding procedures, such as SRS procedures. Once the UE declares its SRS transmission-antenna switching capability, the UE may be prohibited from switching to a different SRS transmission-antenna switching capability without first informing the base station. Otherwise, the base station would perform channel estimation based on the configuration for the wrong SRS transmission-antenna switching capability. But a UE may only be able to declare its SRS transmission-antenna switching capability during the initial connection process, which means that the UE is not able to update its SRS transmission-antenna switching capability without first disconnecting from, and then reconnecting to, the network. Such a procedure may waste time and resources. Although the UE could potentially avoid such a procedure by continuing to use the same SRS transmission-antenna switching capability, doing so may cause the UE to consume excess power. For example, maintaining the configuration associated with the SRS transmission-antenna switching capability may involve powering antennas that do not need to be sounded.

According to the techniques described herein, a UE may (e.g., during the initial connection process) indicate to a base station multiple SRS transmission-antenna switching capabilities supported by the UE (as opposed to a single SRS transmission-antenna switching capability). The UE may use a configuration associated with a default SRS transmission-antenna switching capability until triggered to change SRS transmission-antenna switching configuration. By informing the base station of multiple supported SRS transmission-antenna switching capabilities, the UE may change its configuration for SRS procedures while maintaining a connection with the base station.

In a first implementation, the base station may determine that the UE is to change its configuration. For example, the base station may determine that the number of antennas for sounding can be reduced because the maximum number of multiple-input multiple-output (MIMO) layers for downlink signaling has been reduced. Accordingly, the base station may select an SRS antenna sounding capability that is associated with a configuration that has a number of antennas equal to or less than the number of antennas used for receiving the MIMO layers. The base station may send an explicit indication of the selected SRS transmission-antenna switching capability to the UE. In some examples, the indication may be a field in a message that informs the UE of the change in downlink MIMO layers. Because the base station explicitly triggers the UE, during a subsequent sounding procedure the base station can estimate the uplink channel based on the appropriate configuration without additional signaling from the UE.

In a second implementation, the UE may determine that it is to change configurations. The UE may make the determination based on a message from the base station that updates the bandwidth part (BWP) configured for the UE. For example, the UE may associate the new BWP with an SRS transmission-antenna switching capability and change its configuration to implement the associated SRS transmission-antenna switching capability. The association between the BWP and the SRS transmission-antenna switching capability may be one of a set of associations received from the base station. Because the base station knows which SRS transmission-antenna switching configuration is associated with a given BWP, during a subsequent sounding procedure the base station can estimate the uplink channel based on the appropriate configuration without additional signaling from the UE.

Aspects of the disclosure are initially described in the context of one or more wireless communications systems. Aspects of the disclosure are also described in the context of process flows that show the chronology of communications in the one or more wireless communications systems. Aspects of the disclosure are further illustrated by and described with reference to apparatus diagrams, system diagrams, and flowcharts that relate to modification of a UE's configuration for a sounding procedure.

FIG. 1 illustrates an example of a wireless communications system 100 that supports dynamic modification of sounding procedure configuration in accordance with aspects of the present disclosure. The wireless communications system 100 may include base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, the wireless communications system 100 may support enhanced broadband communications, ultra-reliable (e.g., mission critical) communications, low latency communications, communications with low-cost and low-complexity devices, or any combination thereof.

Base stations 105 may be dispersed throughout a geographic area to form the wireless communications system 100 and may be devices in different forms or having different capabilities. Base stations 105 and UEs 115 may wirelessly communicate via one or more communication links 125. Each base station 105 may provide a coverage area 110 over which UEs 115 and the base station 105 may establish communication links 125. The coverage area 110 may be an example of a geographic area over which a base station 105 and a UE 115 support the communication of signals according to one or more radio access technologies.

UEs 115 may be dispersed throughout a coverage area 110 of the wireless communications system 100, and each UE 115 may be stationary, or mobile, or both at different times. UEs 115 may be devices in different forms or having different capabilities. Some example UEs 115 are illustrated in FIG. 1. The UEs 115 described herein may be able to communicate with various types of devices, such as other UEs 115, base stations 105, and/or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with the core network 130 through backhaul links 120 (e.g., via an S1, N2, N3, or other interface). Base stations 105 may communicate with one another over backhaul links 120 (e.g., via an X2, Xn, or other interface) either directly (e.g., directly between base stations 105), or indirectly (e.g., via core network 130), or both. In some examples, backhaul links 120 may be or include one or more wireless links.

One or more of base stations 105 described herein may include or may be referred to by a person of ordinary skill in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, a machine type communications (MTC) device, or the like, which may be implemented in various objects such as appliances, vehicles, meters, or the like.

The UEs 115 described herein may be able to communicate with various types of devices, such as other UEs 115 that may sometimes act as relays as well as base stations 105 and network equipment including macro eNBs or gNBs, small cell eNBs or gNBs, relay base stations, and the like, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting communication links 125. For example, a carrier used for a communication link 125 may include a portion of a radio frequency spectrum band (e.g., a bandwidth part (BWP)) that is operated according to physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 megahertz (MHz)). Devices of the wireless communications system 100 (e.g., base stations 105, UEs 115, or both) may have hardware configurations that support communications over a particular carrier bandwidth or may be configurable to support communications over one of a set of carrier bandwidths. In some examples, the wireless communications system 100 may include base stations 105 and/or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into BWPs having the same or different numerologies. In some examples, a UE 115 may be configured with multiple BWPs. In some cases, a single BWP for a carrier is active at a given time, and communications for the UE 115 may be restricted to active BWPs.

Time intervals for base stations 105 or UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some cases, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some cases, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, overlapping geographic coverage areas 110 associated with different technologies may be supported by different base stations 105. The wireless communications system 100 may include, for example, a heterogeneous network in which different types of base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some cases, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), a user plane function (UPF)). The control plane entity may manage non-access stratum (NAS) functions such as mobility, authentication, and bearer management for UEs 115 served by base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with UEs 115 through a number of other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features, but the waves may penetrate structures sufficiently for a macro cell to provide service to UEs 115 located indoors. Transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between UEs 115 and base stations 105, and EHF antennas of the respective devices may be smaller and more closely spaced than UHF antennas. In some cases, this may facilitate use of antenna arrays within a device. The propagation of EHF transmissions, however, may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some cases, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, D2D transmissions, or the like.

A base station 105 or UE 115 may be equipped with multiple antennas, which may be used to employ techniques such as transmit diversity, receive diversity, multiple-input multiple-output (MIMO) communications, or beamforming. The antennas of a base station 105 or UE 115 may be located within one or more antenna arrays or antenna panels, which may support MIMO operations or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions and may report to the base station 105 an indication of the signal that the UE 115 received with a highest signal quality, or an otherwise acceptable signal quality.

In some cases, transmissions by a device (e.g., by a base station 105 or UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

UEs 115 and base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some cases, a device may support same-slot HARQ feedback, where the device may provide HARQ feedback in a specific slot for data received in a previous symbol in the slot. In other cases, the device may provide HARQ feedback in a subsequent slot, or according to some other time interval.

In some implementations, a UE 115 may perform a channel sounding procedure, such as a sounding reference signal (SRS) procedure, that enables the base station 105 to estimate the uplink channel (and the downlink channel when reciprocity exists). An SRS may be a known signal that is transmitted from the UE 115 to the base station 105. Upon reception of the SRS, the base station 105 may process it to determine the channel quality of the uplink path for certain frequencies (e.g., certain sections of channel bandwidth). The base station 105 can use this channel information to adjust its communications with the UE 115 (e.g., implement uplink frequency selective scheduling and link adaption, calibrate MIMO channel, improve downlink SNR, etc.).

A UE 115 may include multiple antennas over which the UE 115 is able to receive signals simultaneously. However, the configuration of the UE's transmit chains may prevent the UE 115 from simultaneously transmitting over all of its antennas. For example, the UE 115 may be able to use all of its antennas simultaneously to receive downlink signaling, but the UE 115 may only be able to use a subset of its antennas simultaneously to transmit uplink signaling. Accordingly, a UE 115 may switch between antennas during a sounding procedure to ensure that all relevant antennas are sounded. The ability of a UE 115 to switch between transmit antennas may be referred to herein as the SRS transmission-antenna switching capability of the UE 115. An SRS transmission-antenna switching capability may also be referred to as an SRS capability, an SRS transmission switching capability, and SRS antenna switching capability, or an SRS transmission port switching capability, among other variations.

In one example, the UE 115 may support 1T2R SRS transmission-antenna switching capability, where 1T refers to the quantity of antennas (one) over which the UE 115 can transmit simultaneously when it is configured to simultaneously receive over two antennas (denoted 2R). A UE 115 may support multiple SRS transmission-antenna switching capabilities. For example, in addition to 1T2R, a UE 115 may support 1T4R, 2T2R, and 2T4R, among others.

According to the techniques described herein, a UE 115 may inform a serving base station 105 of multiple SRS transmission-antenna switching capabilities supported by the UE 115. The UE 115 may use one of the SRS transmission-antenna switching capabilities (e.g., a default SRS transmission-antenna switching capability) until it receives a trigger from the base station 105. Upon reception of the trigger, the UE 115 may switch from using the default SRS transmission-antenna switching capability to using a different SRS transmission-antenna switching capability. The new SRS transmission-antenna switching capability may consume less power than the default SRS antenna capability.

Although described with reference to an SRS procedure, the techniques described herein can be implemented in any type of sounding procedure.

Figure 2:
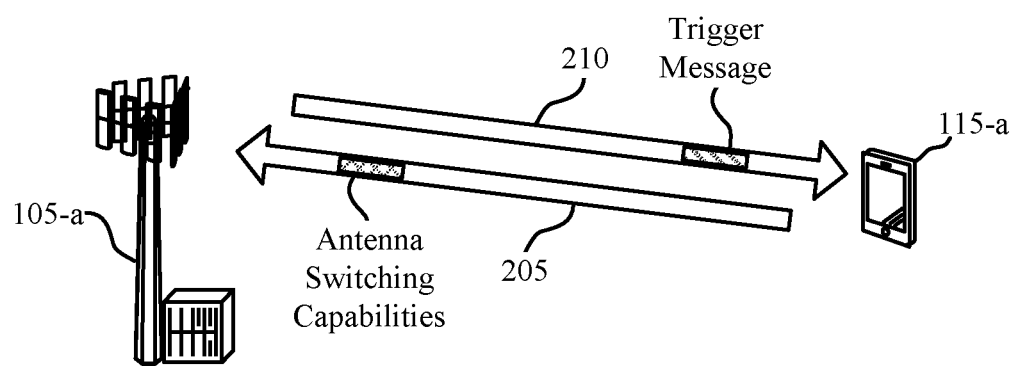
FIG. 2 illustrates an example of a wireless communications system that supports dynamic modification of sounding procedure configuration in accordance with aspects of the present disclosure.

FIG. 2 illustrates an example of a wireless communications system 200 that supports dynamic modification of sounding procedure configuration in accordance with aspects of the present disclosure. In some examples, system 200 may implement aspects of wireless communication system 100. In the illustrated example, system 200 may include UE 115-*a* and base station 105-*a*. UE 115-*a* may be an example of a UE 115 from FIG. 1 and base station 105-*a* may be an example of a base station 105 from FIG. 1.

Base station 105-*a* and UE 115-*a* may communicate with each other via uplink channel 205 and downlink channel 210. In some cases, UE 115-*a* may perform a sounding procedure, such as an SRS procedure, that assists base station 105-*a* with channel estimation. For example, UE 115-*a* may transmit an SRS to base station 105-*a* via uplink channel 205, and base station 105-*a* may use the SRS to determine the quality of uplink channel 205. If there is reciprocity between uplink channel 205 and downlink channel 210, base station 105-*a* may infer the quality of downlink channel 210 based on the quality of uplink channel 205.

Upon initial connection to base station 105-*a*, UE 115-*a* may declare one of its SRS transmission-antenna switching capabilities to base station 105-*a*. UE 115-*a* may use a configuration associated with the declared SRS transmission-antenna switching capability for subsequent SRS procedures with base station 105-*a*. For example, UE 115-*a* may use 2T4R. But if communication conditions change, the configuration associated with the declared SRS switching capability may become inefficient or waste excess power. For instance, the configuration used by UE 115-*a* (e.g., the configuration associated with the declared SRS transmission-antenna switching capability) may result in UE 115-*a* sounding all antennas even though UE 115-*a* is only receiving over a subset of the antennas. Keeping all antennas activated for sounding when only a subset of antennas are used for communication may waste power at the UE 115-*a*. And in some cases, continuing to sound over all antennas when only a subset of the antennas is used for reception may confuse base station 105-*a*. For example, base station 105-*a* may attempt to transmit to two antennas that have the best channel quality, but those two antennas may not be the antennas that are activated for reception.

Although it might be beneficial for UE 115-*a* to change configurations when communication conditions or parameters change, UE 115-*a* may refrain from making the change because conventionally doing so requires UE 115-*a* to disconnect from, then reconnect to, base station 105-*a*. For example, UE 115-*a* may only be permitted to indicate its SRS transmission-antenna switching capability upon initial connection to base station 105-*a*. So, when UE 115-*a* is faced with changed conditions, UE 115-*a* may either 1) change configurations by breaking and re-establishing a connection with base station 105-*a*, which may introduce latency and waste radio resources or 2) continue to use the same configuration, which may be inefficient and waste power given the new conditions.

According to the techniques described herein, UE 115-*a* may indicate several of its supported SRS transmission-antenna switching capabilities to base station 105-*a*. In some cases, UE 115-*a* may indicate a default SRS transmission-antenna switching capability that UE 115-*a* uses absent instructions to the contrary and a fallback SRS transmission-antenna switching capability that UE 115-*a* uses when triggered to do so. In other cases, UE 115-*a* may indicate a set of two or more SRS transmission-antenna switching capabilities. By indicating multiple SRS transmission-antenna switching capabilities as opposed to one, UE 115-*a* may enable base station 105-*a* to trigger a change in the configuration of UE 115-*a* without first tearing down the existing connection and establishing a new one. For example, base station 105-*a* may transmit a trigger message that prompts UE 115-*a* to change its configuration to one that is more appropriate with current communications parameters and conditions.

In a first example implementation, base station 105-*a* may determine (e.g., after receiving the SRS transmission-antenna switching capabilities from UE 115-*a*) that the maximum quantity of MIMO layers for downlink communications has changed (e.g., been reduced). For example, base station 105-*a* may determine that subsequent downlink transmissions will occur via two antennas rather than four, so that the maximum quantity of MIMO layers is reduced from four to two. Base station 105-*a* may indicate the new number of maximum MIMO layers to UE 115-*a* via a message (e.g., a max_number_MIMO_layer message) so that UE 115-*a* can deactivate any antennas in excess of the number of MIMO layers. The message may also include an indication that UE 115-*a* is to change from using a first configuration associated with a first SRS transmission-antenna switching capability to a second configuration associated with a second SRS transmission-antenna switching capability. The second configuration may include a quantity of antennas that matches the maximum quantity of MIMO layers. Thus, UE 115-*a* may perform an SRS procedure using the same number of antennas that are used to receive downlink signaling, thereby saving power that would otherwise be used to perform sounding over additional antennas. Because base station 105-*a* explicitly indicated the second SRS transmission-antenna switching capability to UE 115-*a*, base station 105-*a* may estimate the uplink channel based on the associated configuration without additional signaling.

In a second example implementation, base station 105-*a* may associate (e.g., after receiving the SRS transmission-antenna switching capabilities from UE 115-*a*) each supported SRS transmission-antenna switching capability with a bandwidth part (BWP) configured for the UE. A bandwidth part may be a subset of contiguous common physical resource blocks (PRBs), and a UE may be configured with up to four BWPs in the uplink or four BWPs in the downlink. Because different BWPs may be associated with different maximum quantities of MIMO layers, base station 105-*a* may associate an SRS transmission-antenna switching capability with a BWP based on the maximum quantity of MIMO layers associated with the BWP. For example, a high throughput BWP with a relatively high quantity of MIMO layers may be associated with 2T4R, whereas a power saving BWP with a relatively low maximum quantity of MIMO layers may be associated with 1T2R.

After associating each SRS transmission-antenna switching capability with a BWP, base station 105-*a* may send an indication of the associations to UE 115-*a*. When base station 105-*a* determines to change the BWP configuration of UE 115-*a*, base station 105-*a* may send an indication of the change to UE 115-*a* in a BWP configuration message. Upon receiving the BWP configuration message, UE 115-*a* may use the previously indicated BWP associations to select a new configuration for use. The new configuration may include a quantity of antennas that matches the maximum quantity of MIMO layers so that UE 115-*a* does not waste power activating unused antennas during an SRS sounding procedure. Because base station 105-*a* is aware of the association between the BWP and the SRS transmission-antenna switching capability, base station 105-*a* may estimate the uplink channel based on the associated configuration without additional signaling.

Figure 3:
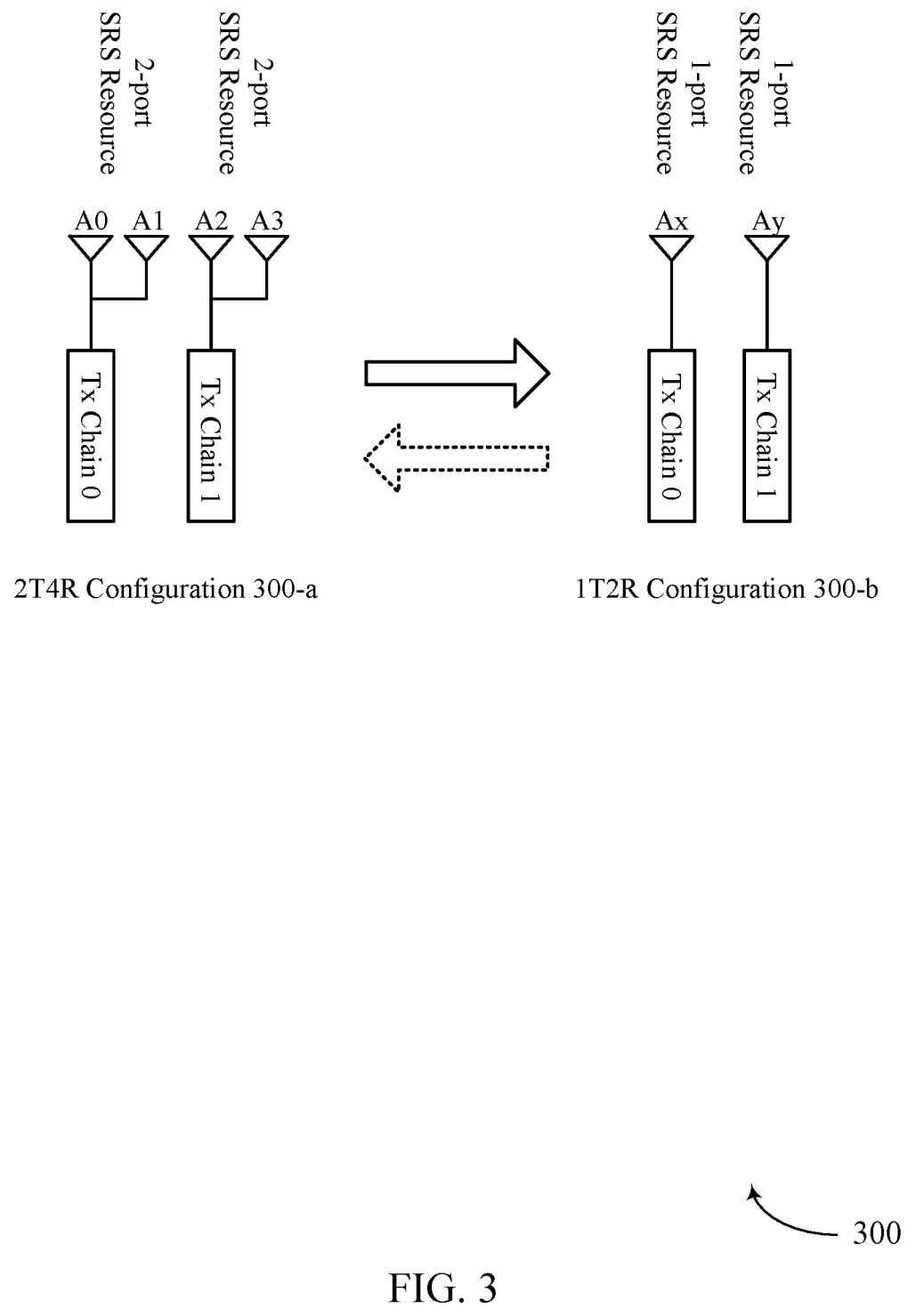
FIG. 3 illustrates an example of configurations that support dynamic modification of sounding procedure configuration in accordance with aspects of the present disclosure.

FIG. 3 illustrates an example of configurations 300 that support dynamic modification of sounding procedure configuration in accordance with aspects of the present disclosure. Configurations 300 may be configurations of a UE 115 as described with reference to FIGS. 1 and 2.

In some examples, a UE may not be able to simultaneously transmit over all the antennas it uses to simultaneously receive. This is because two or more antennas may share a single transmit chain (e.g., transmit chain 0 or transmit chain 1). However, the UE may determine that it supports multiple SRS transmission-antenna switching capabilities that allow the UE to sound over all of its antennas. For example, the UE may determine that it supports both 2T4R and 1T2R. In such an example, the UE may be capable of 1) simultaneously transmitting over two antennas and simultaneously receiving over four antennas (2T4R capability), and 2) simultaneously transmitting over one antenna and simultaneously receiving over two antennas (1T2R capability). Put another way, the UE may be capable of 1) switching between two sets of two antennas for transmission when four antennas are configured for reception (2T4R), and 2) switching between two antennas for transmission when two antennas are configured for reception (1T2R).

Each SRS transmission-antenna switching capability supported by the UE may be associated with a configuration 300. For example, 2T4R may be associated with configuration 300-*a* and 1T4R may be associated with configuration 300-*b*. A configuration 300 may include a unique set of transmission chains, activated and/or deactivated antennas, enabled and/or disabled ports, and/or SRS resources. A port may refer to a logical entity that is distinct from (but may map to) a physical antenna. In some cases, a port may be assigned its own reference signal and/or its own resource grid (e.g., grid of resource elements). An SRS resource may refer to radio resources (e.g., time and frequency) over which an SRS signal is transmitted. In some examples, an SRS resource may have or be associated with one or more ports (e.g., an SRS resource may be within the resource grid of a port). Multiple SRS resources may be referred to herein as an SRS resource set. A base station may configure one or more SRS resource sets for a UE.

After the UE determines the SRS transmission-antenna switching capabilities it supports, the UE may indicate the SRS transmission-antenna switching capabilities to a base station. The UE may also select one of the SRS transmission-antenna switching capabilities to use for SRS procedures until the UE is triggered to switch capabilities. For example, the UE may select one of the SRS transmission-antenna switching capabilities as its default or initial capability and use the configuration associated with that capability until prompted to do otherwise (e.g., until prompted to use a fallback or different capability).

In the example shown in FIG. 3, the UE may opt to use 2T4R configuration 300-*a* as its default or initial configuration. In configuration 300-*a*, the UE may sound all four antennas (e.g., antennas A0, A1, A2, and A3) by switching between antennas. For example, the UE may use antenna A0 and antenna A2 to simultaneously transmit one or more SRSs over a first SRS resource associated with two ports. Then the UE may use antenna A1 and antenna A3 to simultaneously transmit one or more SRSs over a second SRS resource associated with two ports.

At some point, the UE may be triggered by the base station to change SRS transmission-antenna switching capabilities. For example, the UE may receive a message that explicitly or implicitly prompts the UE to use 1T4R. Accordingly, the UE may switch from configuration 300-*a* to configuration 300-*b*. In configuration 300-*b*, the UE may sound two of the four antenna (e.g., the UE may sound antennas Ax and Ay, which may be any of antennas A0 through A3). For instance, the UE may use antennas Ax and Ay to transmit (simultaneously or sequentially, depending on which antennas are used) one or more SRSs over an SRS resource associated with a single port. By using a different configuration than the initial configuration (e.g., a configuration with fewer active antennas), the UE may conserve power.

In some cases, the UE may continue to use the new configuration until prompted by the base station to change capabilities. For example, the UE may be prompted to switch from the configuration associated with 1T2R to the configuration associated with 2T4R. Or, the UE may be prompted to switch to a configuration associated with a third SRS transmission-antenna switching capability. By dynamically changing between SRS transmission-antenna switching capabilities, the UE may adapt to changing communication conditions.

Figure 4:
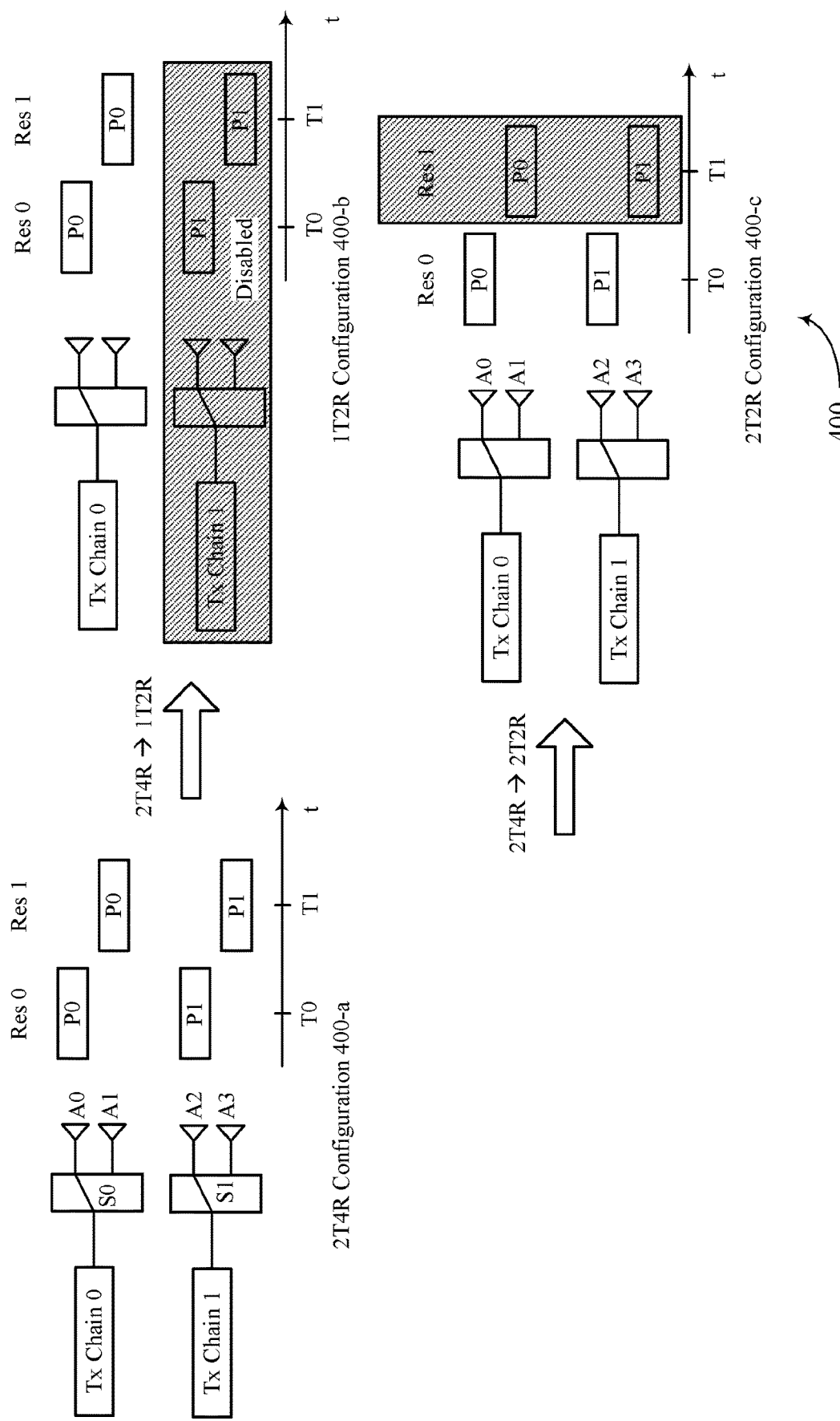
FIG. 4 illustrates an example of configurations that support dynamic modification of sounding procedure configuration in accordance with aspects of the present disclosure.

FIG. 4 illustrates an example of configurations 400 that support dynamic modification of sounding procedure configuration in accordance with aspects of the present disclosure. Configurations 400 may be examples of configurations of a UE 115 as described with reference to FIGS. 1 and 2. In some cases, the UE may include a transmitter or transceiver that includes multiple transmit chains (e.g., transmit chain 0 and transmit chain 1), switching components (e.g., switching components S0 and S1), and antennas (e.g., antennas A0 through A3). Configurations 400 may include configuration 400-a, configuration 400-b, and configuration 400-c. Each configuration 400 may be associated with an SRS transmission-antenna switching capability and/or resource set.

In some cases, a base station may configure a UE with multiple SRS resource sets, each of which is associated with an SRS transmission-antenna switching capability. For example, the UE may be configured with a first SRS resource set, SRS-ResourceSet0, that is associated with a first SRS transmission-antenna switching capability (e.g., 2T4R capability) and a second SRS resource set, SRS-ResourceSet1, that is associated with a second SRS transmission-antenna switching capability (e.g., 1T4R). Each SRS resource set may include one or more SRS resources, and each SRS resource may be associated with one or more ports. For example, SRS-ResourceSet0 may include two SRS resources, Resource 0 and Resource 1, each of which has two ports (Port 0 and Port 1). And SRS-ResourceSet1 may include two SRS resources, Resource 0 and Resource 1, each of which has a single port (Port 0). Although described with reference to one SRS resource set per SRS transmission-antenna switching capability, a base station may configure multiple SRS resource sets per SRS transmission-antenna switching capability.

After reporting its supported SRS transmission-antenna switching capabilities, the UE may initially use configuration 400-a, which may be associated with the 2T4R capability (and thus SRS-ResourceSet0). While using configuration 400-a, the UE may use antennas A0 and A2 to transmit one or more SRSs over Resource 0 during time slot T0. The UE may also use antennas A1 and A3 to transmit one or more SRS ports over Resource 1 during time slot T1. Thus, the UE may sound antennas A0 through A3 and all ports and SRS resources in SRS-ResourceSet0.

Upon receiving a trigger to change SRS transmission-antenna switching capabilities, the UE may switch from configuration 400-a to configuration 400-b. Configuration 400-b may be associated with SRS transmission-antenna switching capability 1T2R. While in configuration 400-b, the UE may perform an SRS procedure by using antenna A0 to transmit and SRS over Resource 0 during time slot T0 and using antenna 1 to transmit an SRS over Resource 1 during time slot T1. Thus, the UE may sound antennas A0 and A1 and all ports and SRS resources in SRS-ResourceSet1. Because the sounding in configuration 400-b permits transmit chain 1 to be disabled (e.g., powered down), the UE may save power compared to configuration 400-a.

In some cases, the base station may configure the UE with a single SRS resource set that is associated with multiple SRS transmission-antenna switching capabilities supported by the UE. For example, the base station may configure the UE with SRS-ResourceSet, which may include one or more SRS resources that are associated with one or more ports. However, the UE may modify the SRS resource set based on the SRS transmission-antenna switching capability indicated by the base station. For instance, the UE may modify the quantity of SRS resources in SRS-ResourceSet and/or the quantity or ports associated with each SRS resource.

In some cases, the UE may follow a predetermined (e.g., fixed) rule when modifying its assigned SRS resource set. In a first example, the predetermined rule may specify that the UE is to sound the first port of each SRS resource and refrain from sounding the second port of the SRS resources. For instance, a UE may be assigned an SRS-ResourceSet that has two SRS resources each associated with two ports. If the UE receives a trigger that prompts it to switch from 2T4R to 1T2R, the UE may, according to the rule, sound the first port for each SRS resource and refrain from sounding the second port for each SRS resource. Thus, the UE's configuration may look something like configuration 400-b. In a second example, the predetermined rule may specify that the UE is to sound first SRS resource of the SRS resource set and refrain from sounding the second SRS resource of the SRS resource set. Using the previous illustration, if the UE receives a trigger that prompts it to switch from 2T4R to 2T2R, the UE may, according to the rule, sound both ports of the first SRS resource in SRS-ResourceSet and refrain from sounding either port of the second SRS resource. Thus, the UE's configuration may look something like configuration 400-c.

In some cases, the UE may follow a rule received from the base station when reconfiguring its assigned SRS resource set. The rule may inform the UE of the SRS resources and/or ports the UE is to use when the UE switches SRS transmission-antenna switching capabilities. Such rule may be similar to the port indication for CSI feedback that is not based on a precoding matrix indicator (PMI).

Figure 5:
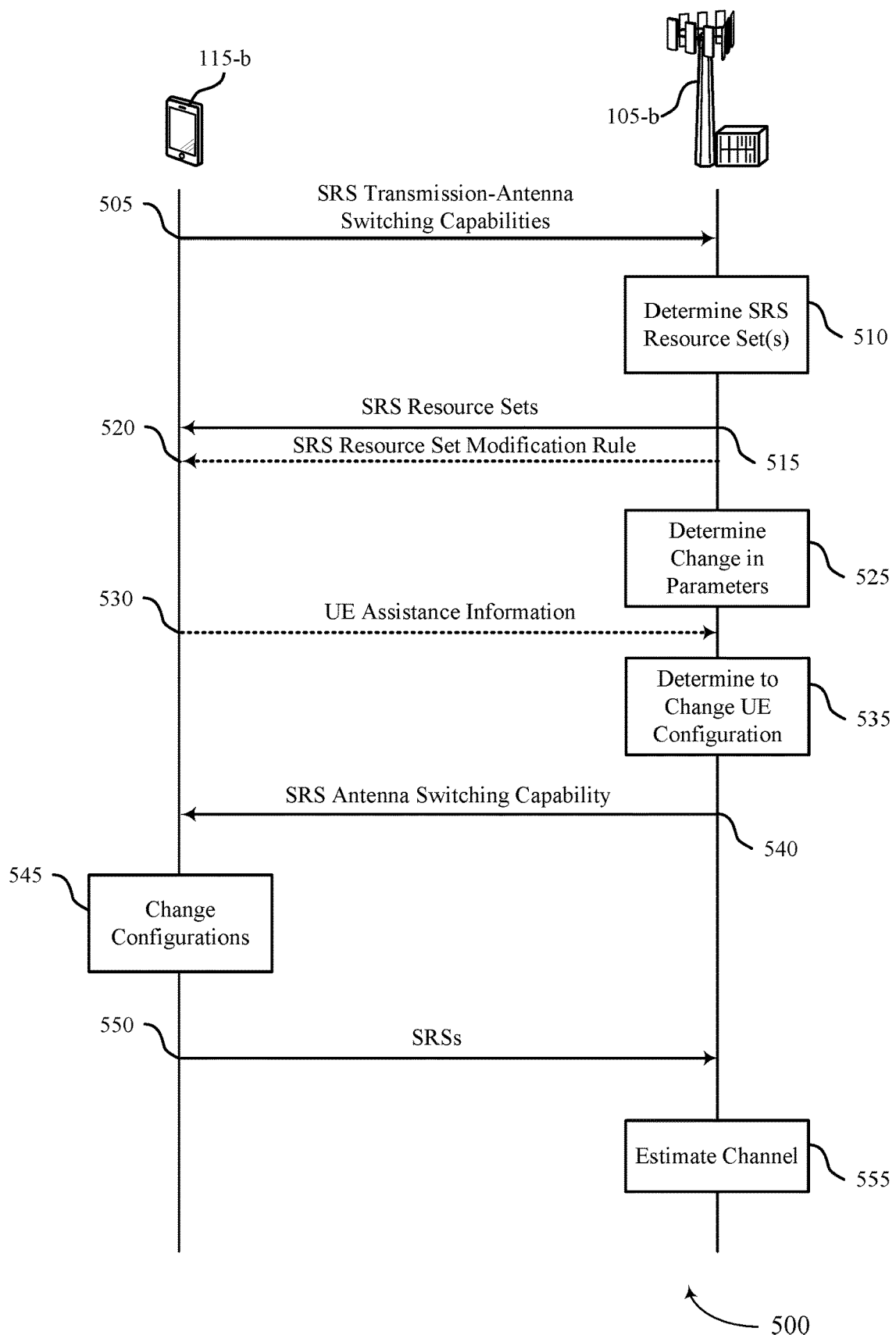
FIG. 5 illustrates an example of a process flow that supports dynamic modification of sounding procedure configuration in accordance with aspects of the present disclosure.

FIG. 5 illustrates an example of a process flow 500 that supports dynamic modification of sounding procedure configuration in accordance with aspects of the present disclosure. In some examples, process flow 500 may implement aspects of wireless communication system 100. Process flow 500 may include UE 115-b and base station 105-b. In the following description of the process flow 500, the operations between base station 105-b and UE 115-b may occur in a different order than the exemplary order shown, or the operations performed by the devices may be performed in different orders or at different times. Certain operations may also be left out of the process flow 500, or other operations may be added to the process flow 500.

At 505, UE 115-b may send an indication of its supported SRS transmission-antenna switching capabilities to base station 105-b. In some cases, the indication may occur during the establishment of a connection with base station 105-b. In some examples, the SRS transmission-antenna switching capabilities include at least a first SRS transmission-antenna switching capability and a second SRS transmission-antenna switching capability. In some examples, UE 115-b may perform an SRS procedure using a first configuration that is associated with the first SRS transmission-antenna switching capability.

At 510, base station 105-b may determine one or more SRS resource sets for UE 115-b. In some examples, base station 105-b may configure UE 115-b with an SRS resource set for each SRS transmission-antenna switching capability supported by UE 115-b. In such cases, each UE configuration associated with an SRS transmission-antenna switching capability may also be associated with a corresponding SRS resource set. In other examples, base station 105-b may configure UE 115-b with a single SRS resource set for some or all of the SRS transmission-antenna switching capabilities supported by UE 115-b. In such cases, some of all of the UE configurations may be associated with the SRS resource set.

At 515, base station 105-b may transmit, and UE 115-b may receive, an indication of the SRS resource set(s) and their associated configurations. For example, UE 115-b may receive an indication of a first SRS resource set that is associated with the first configuration and an indication of a second SRS resource set that is associated with the second configuration. Or UE 115-b may receive an indication of an SRS resource set that is associated with multiple configurations (e.g., the first and second configurations).

In some examples (e.g., when a single SRS resource set is configured for UE 115-b), base station 105-b may transmit, and UE 115-b may receive, and indication of a rule for modifying the SRS resource set. The indication may be transmitted at 520. Thus, UE 115-b may identify a rule for modifying the SRS resource set. In some cases, the rule specifies which SRS resources and/or ports UE 115-b is to use for a certain configuration.

At 525, base station 105-b may determine that communication parameters should change, or base station 105-b may detect that communication parameters have changed. A communication parameter may be the quantity of antennas or maximum quantity of MIMO layers used for downlink signaling, or the BWP configuration for UE 115-b, among other parameters. In one example, base station 105-b may determine that the maximum quantity of MIMO layers used for downlink signaling should be changed from a first number to a second (e.g., lower) number.

In some examples, UE 115-b may, at 530, send an indication of an SRS transmission-antenna switching capability that UE 115-b has determined it prefers. UE 115-b may send the indication autonomously. In some cases, the indication may be based on conditions at UE 115-b (e.g., battery power). In some cases, the indication may be based on a change in communications parameters detected by UE 115-b.

At 535, base station 105-b may determine that the configuration used by UE 115-b should be changed from a first configuration associated with a first SRS transmission-antenna switching capability to a second configuration associated with a second SRS transmission-antenna switching capability. Base station 105-b may make the determination based on the preferred SRS indication from UE 115-b and/or based on the change in communication parameters. For example, when the maximum quantity of MIMO layers is reduced from y layers to x layers, base station 105-b may determine that UE 115-b should use the configuration with x active antennas. Thus, base station 105-b may select a configuration that enables sounding over the same number of antennas that UE 115-b uses to receive downlink communications.

At 540, base station 105-b may transmit a message to UE 115-b that triggers UE 115-b to change configurations. The message may be a Layer 1 or Layer 2 message, such as a downlink control information (DCI) message or a medium access control (MAC) control element (MAC-CE) message. In some cases, the message may include an explicit indication of the SRS transmission-antenna switching capability UE 115-b is to use. For example, the message may be a max_number_MIMO_layer message that not only informs UE 115-b of a change in the maximum quantity of MIMO layers, but also indicates the second SRS transmission-antenna switching capability.

At 545, UE 115-b may change configurations based on the message received at 540. For example, UE 115-b may change from the first configuration associated with the first SRS transmission-antenna switching capability to the second configuration associated with the second SRS transmission-antenna switching capability. In some cases, changing the configurations includes changing the activation state of one or more antennas (e.g., enabling or disabling one or more antennas). In some cases, changing the configurations includes changing the activation state of one or more ports (e.g., enabling or disabling one or more ports). In some cases, changing the configurations includes changing SRS resource set(s). The second configuration may consume less power than the first configuration.

At 550, UE 115-b may perform an SRS procedure with base station 105-b by transmitting one or more SRSs to base station 105-b. The SRSs may be transmitted using the second configuration associated with the second SRS transmission-antenna switching capability. When UE 115-b is configured with multiple SRS resource sets, the SRSs may be transmitted using the one of the SRS resource sets. When UE 115-b is configured with a single SRS resource set, UE 115-b may first modify the SRS resource set before using for the transmission of SRSs. The modification of the SRS resource set may be based on a predetermined rule identified by UE 115-b or a rule received from base station 105-b (e.g., at 520).

At 555, base station 105-b may estimate the uplink channel based on the SRSs received from UE 115-b and based on the second configuration. Thus, UE 115-b may efficiently assist with channel estimation by limiting sounding to relevant antennas.

Figure 6:
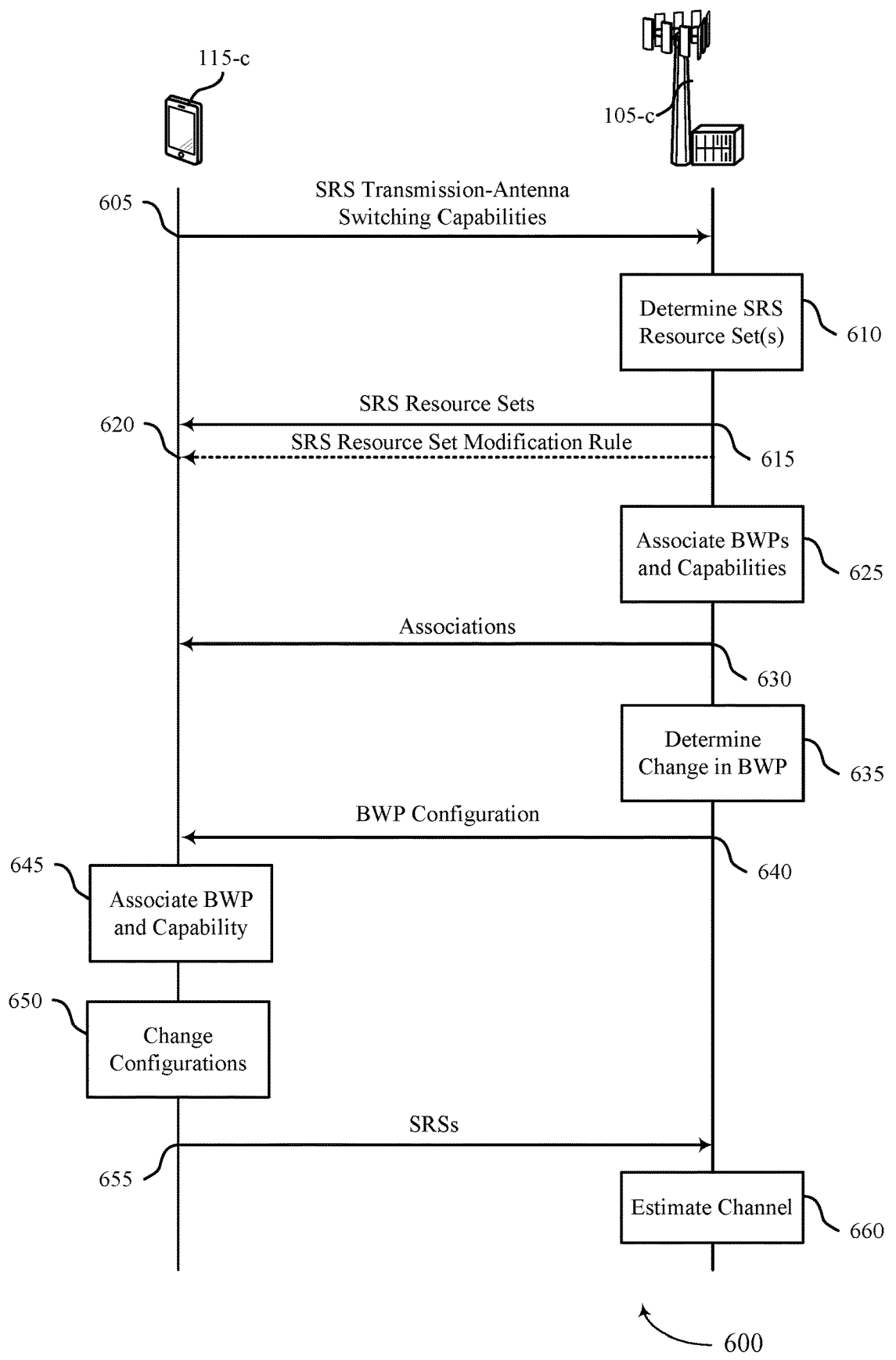
FIG. 6 illustrates an example of a process flow that supports dynamic modification of sounding procedure configuration in accordance with aspects of the present disclosure.

FIG. 6 illustrates an example of a process flow 600 that supports dynamic modification of sounding procedure configuration in accordance with aspects of the present disclosure. In some examples, process flow 600 may implement aspects of wireless communication system 100. In the illustrated example, process flow 600 may include UE 115-c and base station 105-c. In the following description of the process flow 600, the operations between base station 105-c and UE 115-c may occur in a different order than the exemplary order shown, or the operations performed by the devices may be performed in different orders or at different times. Certain operations may also be left out of the process flow 600, or other operations may be added to the process flow 600.

At 605, UE 115-c may transmit an indication of its supported SRS transmission-antenna switching capabilities to base station 105-c. In some cases, the indication may occur during the establishment of a connection with base station 105-c. In some examples, the SRS transmission-antenna switching capabilities include a default capability and a fallback capability. In other examples, the SRS transmission-antenna switching capabilities include a set of capabilities. In some examples, UE 115-b may perform an SRS procedure using a first configuration that is associated with the one of the SRS transmission-antenna switching capabilities.

At 610, base station 105-c may determine one or more SRS resource sets for UE 115-c. In some examples, base station 105-b may configure UE 115-c with multiple SRS resource sets (e.g., an SRS resource set for each SRS transmission-antenna switching capability supported by UE 115-c). Thus, each UE configuration may be associated with a respective SRS resource set. In other examples, base station 105-c may configure UE 115-b with a single SRS resource set. Thus, some or all of the UE configurations may be associated with a single SRS resource set.

At 615, base station 105-*c* may transmit, and UE 115-*c* may receive, an indication of the SRS resource set(s) and their associated configuration(s). For example, UE 115-*c* may receive an indication of a first SRS resource set that is associated with the first configuration and an indication of a second SRS resource set that is associated with the second configuration. Or UE 115-*c* may receive an indication of an SRS resource set that is associated with multiple configurations (e.g., the first and second configurations).

In some examples (e.g., when a single SRS resource set is configured for UE 115-*c*), base station 105-*c* may transmit, and UE 115-*c* may receive, and indication of a rule for modifying the SRS resource set. The indication may be transmitted at 620. Thus, UE 115-*c* may identify a rule for modifying the SRS resource set. In some cases, the rule specifies which SRS resources and/or ports UE 115-*c* is to use for a certain configuration. In other examples, UE 115-*c* may identify a predetermine rule for modifying the SRS resource set.

At 625, base station 105-*c* may associate each SRS transmission-antenna switching capability with a corresponding BWP. For example, a BWP for high throughput may be associated with the first configuration (e.g., 2T4R) and a BWP for power saving may be associated with the second configuration (e.g., 1T2R). The association may be based on the maximum quantity of MIMO layers used with a BWP.

At 630, base station 105-*c* may transmit an indication of the associations to UE 115-*c*. Thus, UE 115-*c* may determine the association between its supported SRS transmission-antenna switching capabilities and corresponding BWPs. At 635, base station 105-*c* may determine to change the BWP configured for UE 115-*c*. At 640, base station 105-*c* may transmit, and UE 115-*c* may receive, an indication of the BWP.

At 645, UE 115-*c* may determine the association between the indicated BWP and one of its SRS transmission-antenna switching capabilities. At 650, UE 115-*c* may change its configuration to be the configuration associated with the SRS transmission-antenna switching capability associated with the BWP. At 655, UE 115-*c* may perform an SRS procedure with base station 105-*c* by transmitting SRSs using the new configuration. When UE 115-*c* is configured with multiple SRS resource sets, the SRSs may be transmitted using the one of the SRS resource sets. When UE 115-*c* is configured with a single SRS resource set, UE 115-*c* may first modify the SRS resource set before using for the transmission of SRSs. The modification of the SRS resource set may be based on a predetermined rule identified by UE 115-*c* or a rule received from base station 105-*c*. At 660, base station 105-*c* may estimate the uplink channel based on the SRSs received from UE 115-*c* and based on the configuration associated with the BWP.

Figure 7:
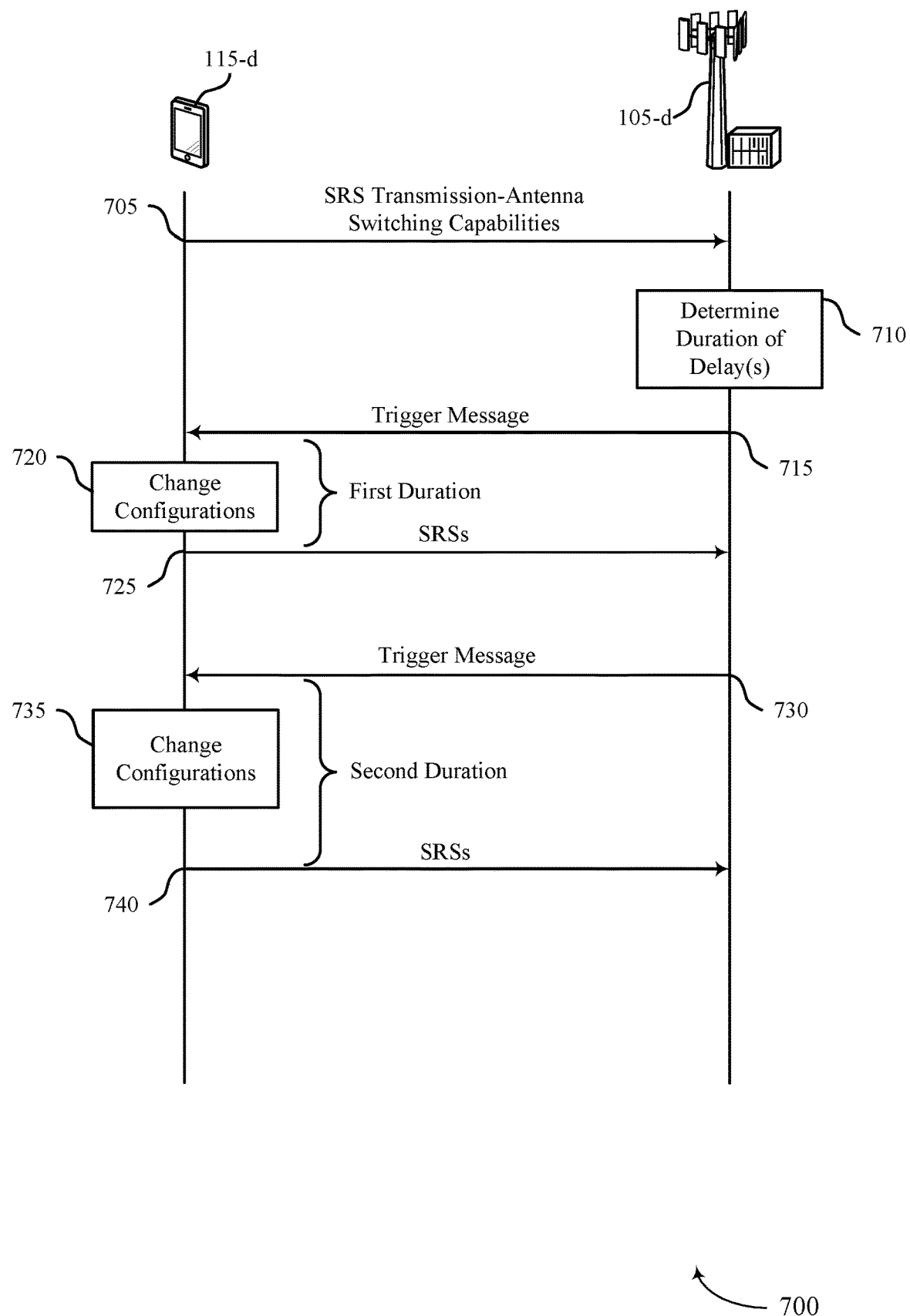
FIG. 7 illustrates an example of a process flow that supports dynamic modification of sounding procedure configuration in accordance with aspects of the present disclosure.

FIG. 7 illustrates an example of a process flow 700 that supports dynamic modification of sounding procedure configuration in accordance with aspects of the present disclosure. In some examples, process flow 700 may implement aspects of wireless communication system 100. In the illustrated example, process flow 700 may include UE 115-*d* and base station 105-*d*. In the following description of the process flow 700, the operations between base station 105-*d* and UE 115-*d* may occur in a different order than the exemplary order shown, or the operations performed by the devices may be performed in different orders or at different times. Certain operations may also be left out of the process flow 700, or other operations may be added to the process flow 700.

At 705, UE 115-*d* may transmit an indication of its supported SRS transmission-antenna switching capabilities to base station 105-*d*. In some cases, the indication may occur during the establishment of a connection with base station 105-*d*. In some examples, the SRS transmission-antenna switching capabilities include a default capability and a fallback capability. In other examples, the SRS transmission-antenna switching capabilities include a set of capabilities.

At 710, base station 105-*d* may determine one or more latencies associated with switching between configurations. For example, base station 105-*d* may determine that switching from the first configuration to the second configuration is associated with a first latency and switching from the second configuration to the first configuration is associated with a second latency that is longer than the first latency. In some cases, the determination of latencies may be based on information from UE 115-*d*. However, base station 105-*d* may not know the exact duration of either latency. Accordingly, base station 105-*d* may determine a first duration of time UE 115-*d* should wait between receiving a trigger message (e.g., to switch from the first configuration to the second configuration) and performing an SRS procedure using the second configuration. Base station 105-*d* may also determine a second duration of time UE 115-*d* should wait between receiving a trigger message (e.g., to switch from the second configuration to the first configuration) and performing an SRS procedure using the first configuration. The duration of time may be based on the latency associated with changing configurations and may be measured from the reception of the trigger message so that base station 105-*d* can know when to expect an SRS procedure using the new configuration. If such a delay was not configured, the base station 105-*d* would not be able to tell whether an SRS procedure following a trigger message was performed using the original configuration or the updated configuration. Such ambiguity could adversely impact the channel estimation performed by base station 105-*d*.

At 715, base station 105-*d* may transmit, and UE 115-*d* may receive, a first message that triggers UE 115-*d* to change from a first configuration to second configuration. In cases where the SRS transmission-antenna switching capabilities include a default capability and a fallback capability, the message may prompt UE 115-*d* to switch from a configuration associated with the default capability to a configuration associated with the fallback capability. In cases where the SRS transmission-antenna switching capabilities include a set of switching capabilities, the message may trigger UE 115-*d* to switch from a configuration associated with the default capability to a configuration associated with one of the other SRS transmission-antenna switching capabilities. In some examples, the first message may include an indication of the first duration of time and/or the second duration of time determined at 710. In other examples, the indication of the first duration and/or second duration may be sent in a message other than the first message.

In some cases, the first message may include an explicit indication of the SRS transmission-antenna switching capability UE 115-*d* is to use for an upcoming SRS procedure. In other cases, the first message may implicitly prompt UE 115-*d* to change configurations by indicating a change in a communication parameter (e.g., BWP) that is associated with an SRS transmission-antenna switching capability. At 720, UE 115-*d* may change configurations based on the message received at 715. At 725, UE 115-*d* may perform an SRS procedure using the new configuration (e.g., the second configuration). For example, UE 115-*d* may transmit one or more SRSs to base station 105-*d* using the second configuration. However, UE 115-*d* may refrain from performing the SRS procedure until after the first duration of time has expired.

At 730, base station 105-*d* may transmit a second message that triggers UE 115-*d* to change configurations (e.g., from the second configuration to the first configuration). In cases where the SRS transmission-antenna switching capabilities include a default capability and a fallback capability, the second message may prompt UE 115-*d* to switch from the configuration associated with the fallback capability to the configuration associated with the default capability. In cases where the SRS transmission-antenna switching capabilities include a set of switching capabilities, the message may prompt UE 115-*d* to switch from the configuration associated with the second SRS transmission-antenna switching capability to the configuration associated with the default SRS transmission-antenna switching capability or a third SRS transmission-antenna switching capability from the set. In some examples, the second message may include an indication of the second duration determined at 710. In other cases, the indication of the second duration may be sent in a message other than the second message.

At 735, UE 115-*d* may change configurations according to the second trigger message. After changing configurations, UE 115-*d* may wait until the second duration has elapsed before performing an SRS procedure with base station 105-*d*. For example, UE 115-*d* may refrain from performing an SRS procedure until after the duration has expired, even if UE 115-*d* is ready to perform the SRS procedure sooner. At 740, UE 115-*d* may perform the SRS procedure by using the latest (e.g., first) configuration to transmit one or more SRSs to base station 105-*d*.

Figure 8:
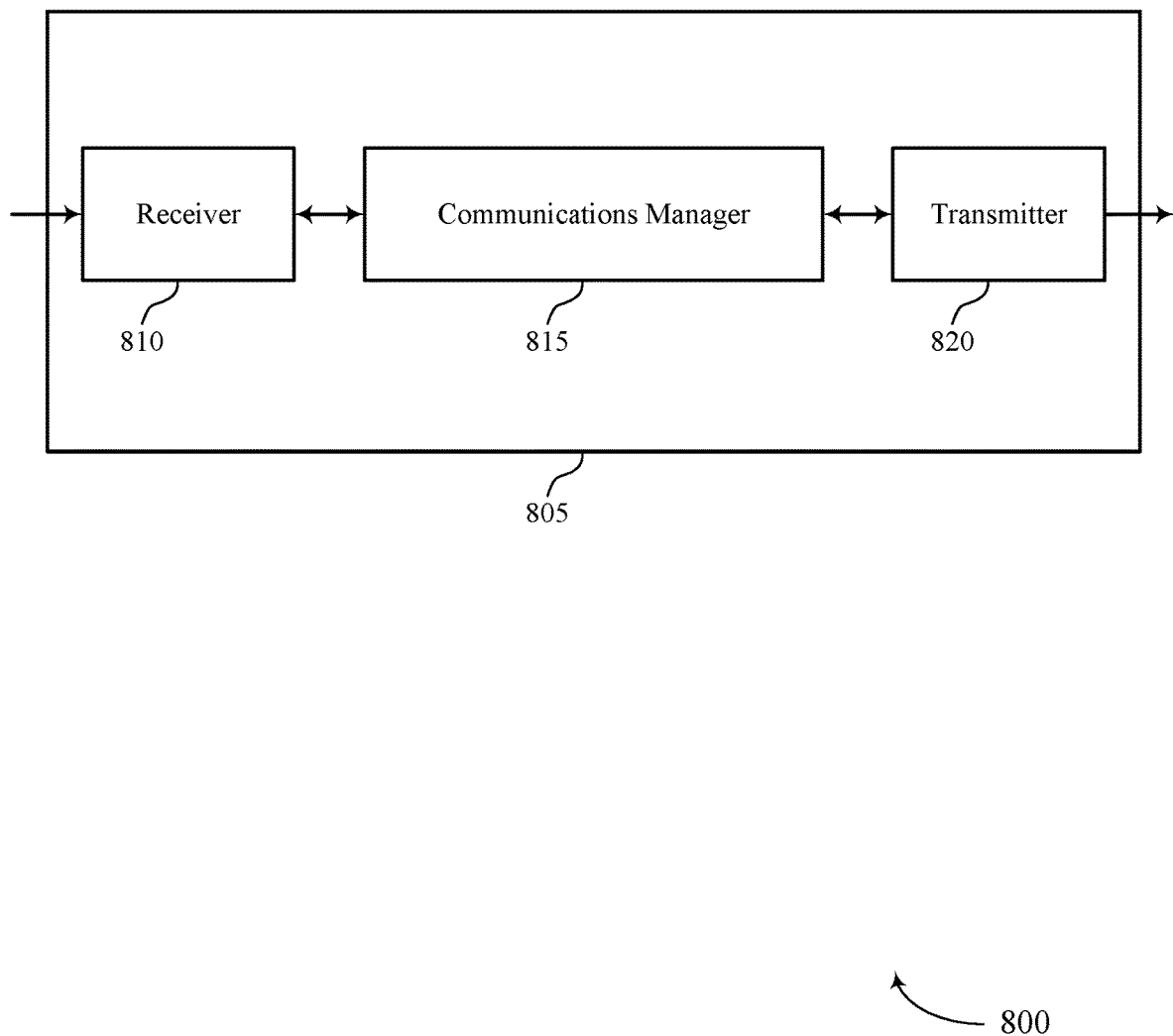
FIGS. 8 and 9 show block diagrams of devices that support dynamic modification of sounding procedure configuration in accordance with aspects of the present disclosure.

FIG. 8 shows a block diagram 800 of a device 805 that supports dynamic modification of sounding procedure configuration in accordance with aspects of the present disclosure. The device 805 may be an example of aspects of a UE as described herein. The device 805 may include a receiver 810, a communications manager 815, and a transmitter 820. The device 805 may also include a processor. Each of these components may be in communication with one another (e.g., via one or more buses).

Receiver 810 may receive information such as packets, user data, or control information associated with various information channels (e.g., control channels, data channels, and information related to dynamic modification of sounding procedure configuration, etc.). Information may be passed on to other components of the device. The receiver 810 may be an example of aspects of the transceiver 1120 described with reference to FIG. 11. The receiver 810 may utilize a single antenna or a set of antennas.

The communications manager 815 may transmit an indication of a set of SRS transmission-antenna switching capabilities supported by the UE, the set of SRS transmission-antenna switching capabilities including at least a first SRS transmission-antenna switching capability and a second SRS transmission-antenna switching capability; receive a message that triggers the UE to switch from using a first configuration associated with the first SRS transmission-antenna switching capability to using a second configuration associated with the second SRS transmission-antenna switching capability; and perform an SRS procedure using the second configuration associated with the second SRS transmission-antenna switching capability based on receiving the message. The communications manager 815 may be an example of aspects of the communications manager 1110 described herein.

The communications manager 1110 as described herein may be implemented to realize one or more potential advantages. For example, by informing the base station of multiple SRS transmission-antenna switching capabilities, the device 805 may switch between configurations without disconnecting and reconnecting from the network (which may introduce latency and waste resources). The new configuration may consume less power than the previous configuration but still be sufficient for sounding (e.g., because it is based on a corresponding change in communications parameters).

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 820 may transmit signals generated by other components of the device. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
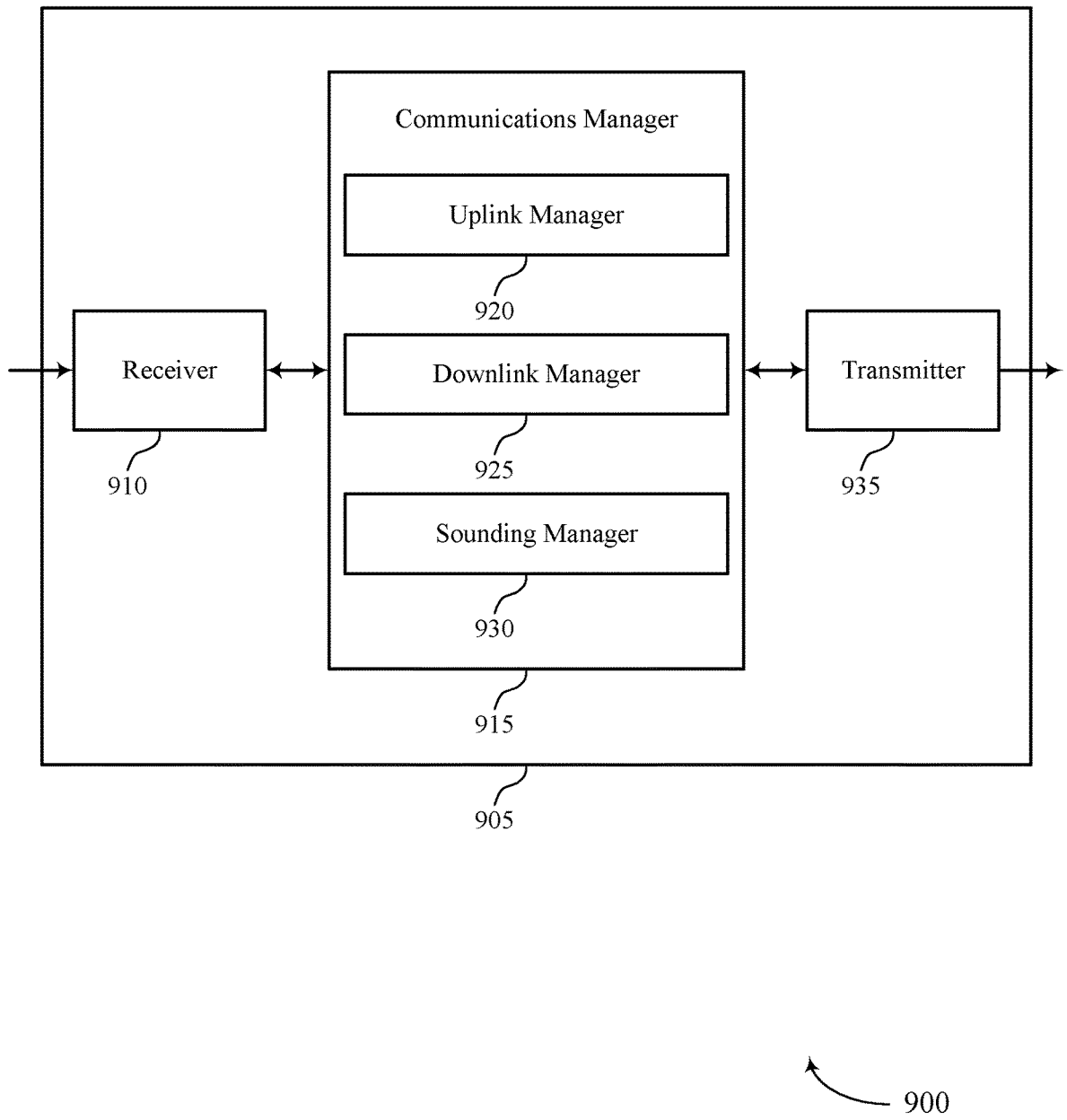

FIG. 9 shows a block diagram 900 of a device 905 that supports dynamic modification of sounding procedure configuration in accordance with aspects of the present disclosure. The device 905 may be an example of aspects of a device 805 or a UE 115 as described herein. The device 905 may include a receiver 910, a communications manager 915, and a transmitter 935. The device 905 may also include a processor. Each of these components may be in communication with one another (e.g., via one or more buses).

Receiver 910 may receive information such as packets, user data, or control information associated with various information channels (e.g., control channels, data channels, and information related to dynamic modification of sounding procedure configuration, etc.). Information may be passed on to other components of the device. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include an uplink manager 920, a downlink manager 925, and a sounding manager 930. The communications manager 915 may be an example of aspects of the communications manager 1110 described herein.

The uplink manager 920 may transmit an indication of a set of SRS transmission-antenna switching capabilities supported by the device 905. The set of SRS transmission-antenna switching capabilities may include at least a first SRS transmission-antenna switching capability and a second SRS transmission-antenna switching capability. By transmitting the set of supported SRS transmission-antenna switching capabilities, the device 805 may change configurations while maintaining a connection with the network, which may decrease latency and conserve resources.

The downlink manager 925 may receive a message that triggers the device 905 to switch from using a first configuration associated with the first SRS transmission-antenna switching capability to using a second configuration associated with the second SRS transmission-antenna switching capability. By receiving the trigger message, the device 905 may adapt its configuration to current communications conditions or parameters, which may conserve power at the device and reduce the processing load at the base station (e.g., because the base station receives SRSs from fewer antennas).

The sounding manager 930 may perform an SRS procedure using the second configuration associated with the second SRS transmission-antenna switching capability based on receiving the message. By performing the SRS procedure using the second configuration, the device 905 may consume less power relative to performing the SRS procedure using the first configuration.

Transmitter 935 may transmit signals generated by other components of the device. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
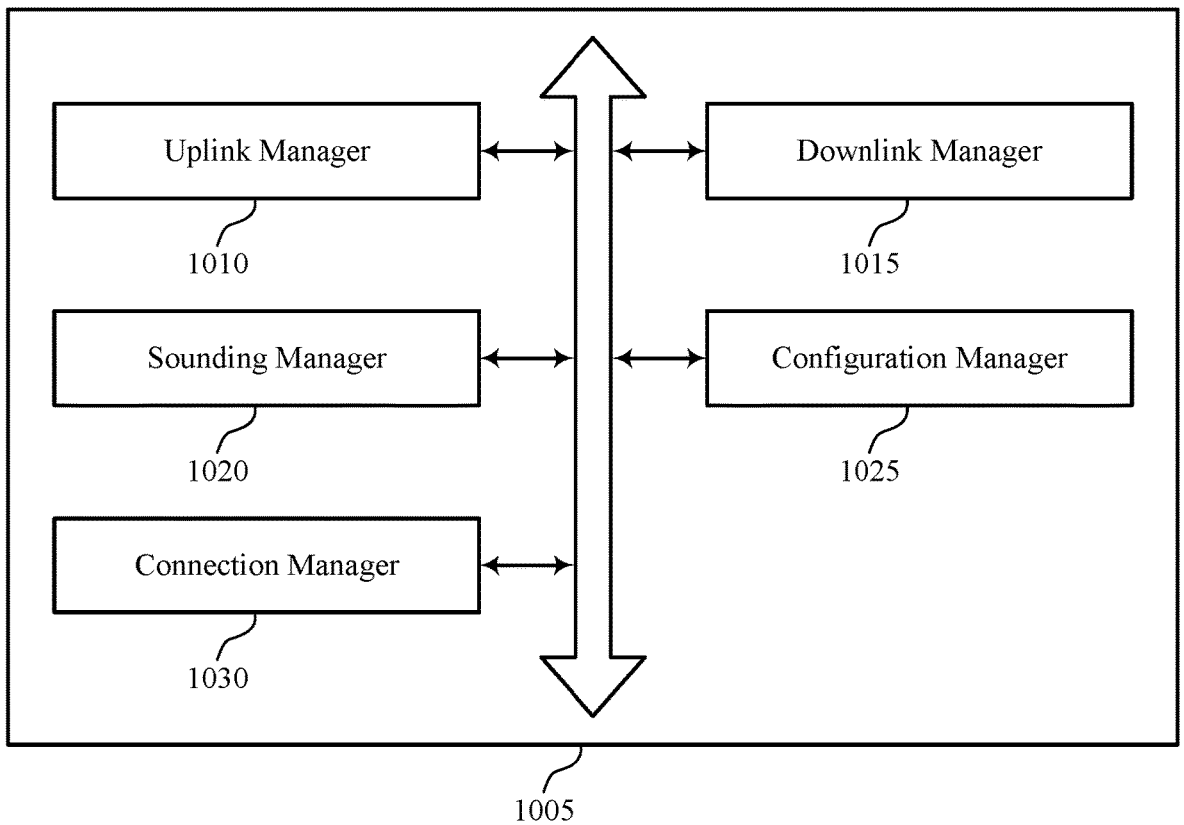
FIG. 10 shows a block diagram of a communications manager that supports dynamic modification of sounding procedure configuration in accordance with aspects of the present disclosure.

FIG. 10 shows a block diagram 1000 of a communications manager 1005 that supports dynamic modification of sounding procedure configuration in accordance with aspects of the present disclosure. The communications manager 1005 may be an example of aspects of a communications manager 815, a communications manager 915, or a communications manager 1110 described herein. The communications manager 1005 may include an uplink manager 1010, a downlink manager 1015, a sounding manager 1020, a configuration manager 1025, and a connection manager 1030. Each of these modules may communicate, directly or indirectly, with one another (e.g., via one or more buses).

The uplink manager 1010 may transmit an indication of a set of SRS transmission-antenna switching capabilities supported by the UE, the set of SRS transmission-antenna switching capabilities including at least a first SRS transmission-antenna switching capability and a second SRS transmission-antenna switching capability. The downlink manager 1015 may receive a message that triggers the UE to switch from using a first configuration associated with the first SRS transmission-antenna switching capability to using a second configuration associated with the second SRS transmission-antenna switching capability. The sounding manager 1020 may perform an SRS procedure using the second configuration associated with the second SRS transmission-antenna switching capability based on receiving the message.

In some cases, each SRS transmission-antenna switching capability indicates a first quantity of antennas over which the UE can simultaneously receive and a second quantity of antennas over which the UE can simultaneously transmit. In some cases, the first configuration includes a first quantity of activated antennas and the second configuration includes a second quantity of activated antennas that is less than the first quantity of activated antennas. In some cases, the message includes a DCI message or a MAC-CE message.

In some examples, the downlink manager 1015 may receive, in the message, an indication of a change in a maximum quantity of MIMO layers for downlink signaling, where a field in the message indicates the second SRS transmission-antenna switching capability. Compared to other implementations, using a field to explicitly indicate the second SRS transmission-antenna switching capability may reduce processing at the UE to effectuate the switch.

In some examples, the downlink manager 1015 may receive, in response to transmitting the indication of the set of SRS transmission-antenna switching capabilities, an indication of an association between each SRS transmission-antenna switching capability and a BWP configured for the UE. In some examples, the uplink manager 1010 may receive, in the message, an indication that the UE is to change from using a first BWP to a second BWP, where the second SRS transmission-antenna switching capability is associated with the second BWP. Compared to other implementations, using a change in communication parameters, such as a change in BWP, to prompt a switch in configurations may reduce signaling used to effectuate the switch.

In some examples, the configuration manager 1025 may determine a preference at the UE for the second configuration associated with the second SRS transmission-antenna switching. In some examples, the uplink manager 1010 may transmit an indication of the preference to a base station.

In some examples, the downlink manager 1015 may receive, in response to transmitting the indication of the set of SRS transmission-antenna switching capabilities, an indication of at least a first SRS resource set that is associated with the first configuration and an indication of at least a second SRS resource set that is associated with the second configuration. In some examples, the sounding manager 1020 may refrain from using one or more SRS resources of the at least one SRS resource or refraining from using one or more ports associated with the at least one SRS resource.

In some examples, the downlink manager 1015 may receive, in response to transmitting the indication of the set of SRS transmission-antenna switching capabilities, an indication of an SRS resource set that is associated with the first configuration and the second configuration. In some examples, the configuration manager 1025 may modify the SRS resource set based on switching from the first configuration to the second configuration. In some examples, the configuration manager 1025 may modify the SRS resource set by changing a quantity of SRS resources associated with the SRS resource set or changing a quantity of ports associated with the SRS resources. In some examples, the configuration manager 1025 may identify a rule (e.g., a predetermined rule) for modifying the SRS resource set, where modifying the SRS resource set is based on the identified rule. In some examples, the downlink manager 1015 may receive a rule for modifying the SRS resource set, where modifying the SRS resource set is based on the received rule.

In some examples, the configuration manager 1025 may change from the first configuration to the second configuration based on the message. In some examples, changing from the first configuration to the second configuration includes changing an activation state of one or more ports, changing an activation state of one or more antennas, and/or changing one or more SRS resources used for the SRS procedure. The connection manager 1030 may maintain a connection with the base station while the UE changes from the first configuration to the second configuration.

In some examples, the downlink manager 1015 may receive an indication of a period of time the UE is to delay before performing the SRS procedure using the second configuration. In some examples, the Sounding Manager 1020 may refrain from performing the SRS procedure using the second configuration until the period of time has elapsed.

In some examples, the downlink manager 1015 may receive a first indication of a first period of time the UE is to wait between receiving a trigger to switch from the first configuration to the second configuration and performing a sounding procedure using the second configuration. In some examples, the downlink manager 1015 may receive a second indication of a second period of time the UE is to wait between receiving a trigger to switch from the second configuration to the first configuration and performing a sounding procedure using the first configuration, where the second period of time is longer than the first period of time. In some examples, the sounding manager 1020 may refrain from performing the SRS procedure using the second configuration until after the first period of time has elapsed. In some examples, the downlink manager 1015 may receive a second message that triggers the UE to switch from the second configuration to the first configuration. In some examples, the sounding manager 1020 may refrain from performing a second SRS procedure using the first configuration until after the second period of time has elapsed.

Figure 11:
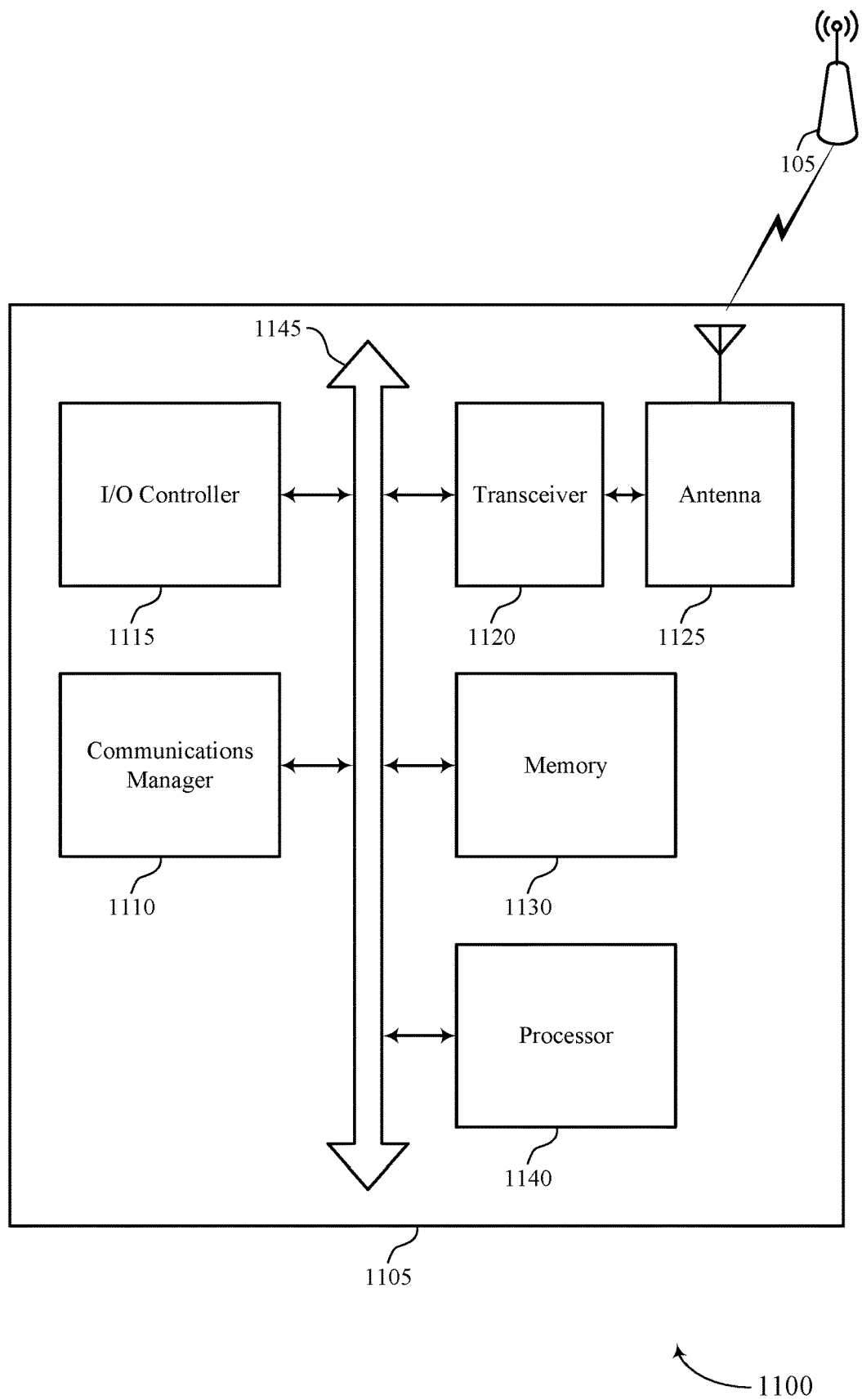
FIG. 11 shows a diagram of a system including a device that supports dynamic modification of sounding procedure configuration in accordance with aspects of the present disclosure.

FIG. 11 shows a diagram of a system 1100 including a device 1105 that supports dynamic modification of sounding procedure configuration in accordance with aspects of the present disclosure. The device 1105 may be an example of or include the components of device 805, device 905, or a UE as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may: transmit an indication of a set of SRS transmission-antenna switching capabilities supported by the device 1105, the set of SRS transmission-antenna switching capabilities including at least a first SRS transmission-antenna switching capability and a second SRS transmission-antenna switching capability; receive a message that triggers the device 1105 to switch from using a first configuration associated with the first SRS transmission-antenna switching capability to using a second configuration associated with the second SRS transmission-antenna switching capability; and perform an SRS procedure using the second configuration associated with the second SRS transmission-antenna switching capability based on receiving the message.

I/O controller 1115 may manage input and output signals for device 1105. I/O controller 1115 may also manage peripherals not integrated into device 1105. In some cases, I/O controller 1115 may represent a physical connection or port to an external peripheral. In some cases, I/O controller 1115 may utilize an operating system such as iOS®, ANDROID®, MS-DOS®, MS-WINDOWS®, OS/2®, UNIX®, LINUX®, or another known operating system. In other cases, I/O controller 1115 may represent or interact with a modem, a keyboard, a mouse, a touchscreen, or a similar device. In some cases, I/O controller 1115 may be implemented as part of a processor. In some cases, a user may interact with device 1105 via I/O controller 1115 or via hardware components controlled by I/O controller 1115.

Transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

Memory 1130 may include RAM and ROM. The memory 1130 may store computer-readable, computer-executable software 1135 including instructions that, when executed, cause the processor to perform various functions described herein. In some cases, the memory 1130 may contain, among other things, a BIOS which may control basic hardware or software operation such as the interaction with peripheral components or devices.

Processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1140 may be configured to operate a memory array using a memory controller. In other cases, a memory controller may be integrated into processor 1140. Processor 1140 may be configured to execute computer-readable instructions stored in a memory to perform various functions (e.g., functions or tasks supporting dynamic modification of sounding procedure configuration).

Figure 12:
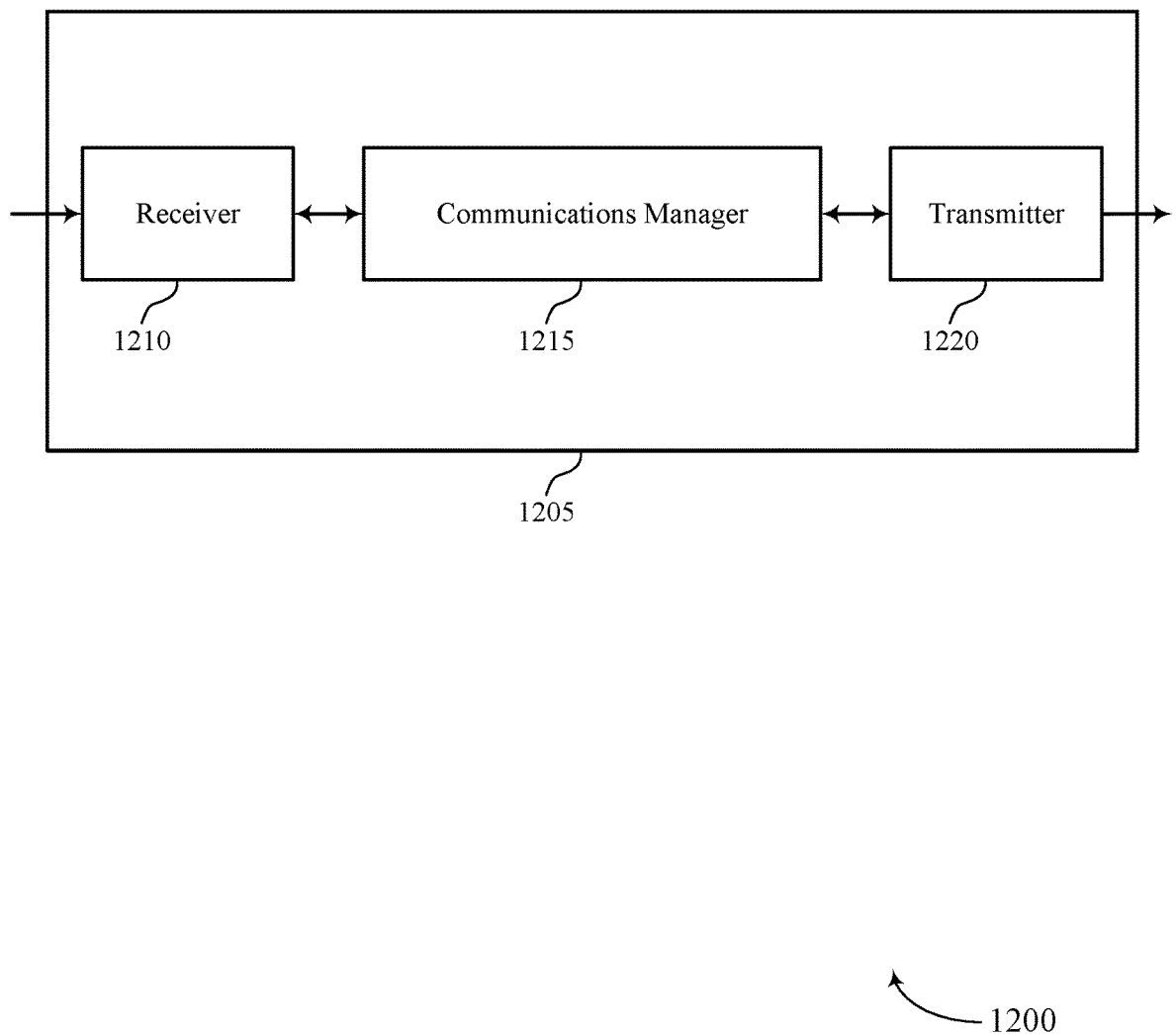
FIGS. 12 and 13 show block diagrams of devices that support dynamic modification of sounding procedure configuration in accordance with aspects of the present disclosure.

FIG. 12 shows a block diagram 1200 of a device 1205 that supports dynamic modification of sounding procedure configuration in accordance with aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to dynamic modification of sounding procedure configuration, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may: receive, from a UE, an indication of a set of SRS transmission-antenna switching capabilities supported by the UE, the set of SRS transmission-antenna switching capabilities including at least a first SRS transmission-antenna switching capability and a second SRS transmission-antenna switching capability; and transmit a message to trigger the UE to switch from using a first configuration associated with the first SRS transmission-antenna switching capability to using a second configuration associated with the second SRS transmission-antenna switching capability.

The communications manager 1215 as described herein may be implemented to realize one or more potential advantages. For example, by receiving the set of SRS transmission-antenna switching capabilities and transmitting the trigger message, the device 1205 may help the UE change to a power-efficient configuration without detaching and re-attaching to the device 1205 (which may waste resources). The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
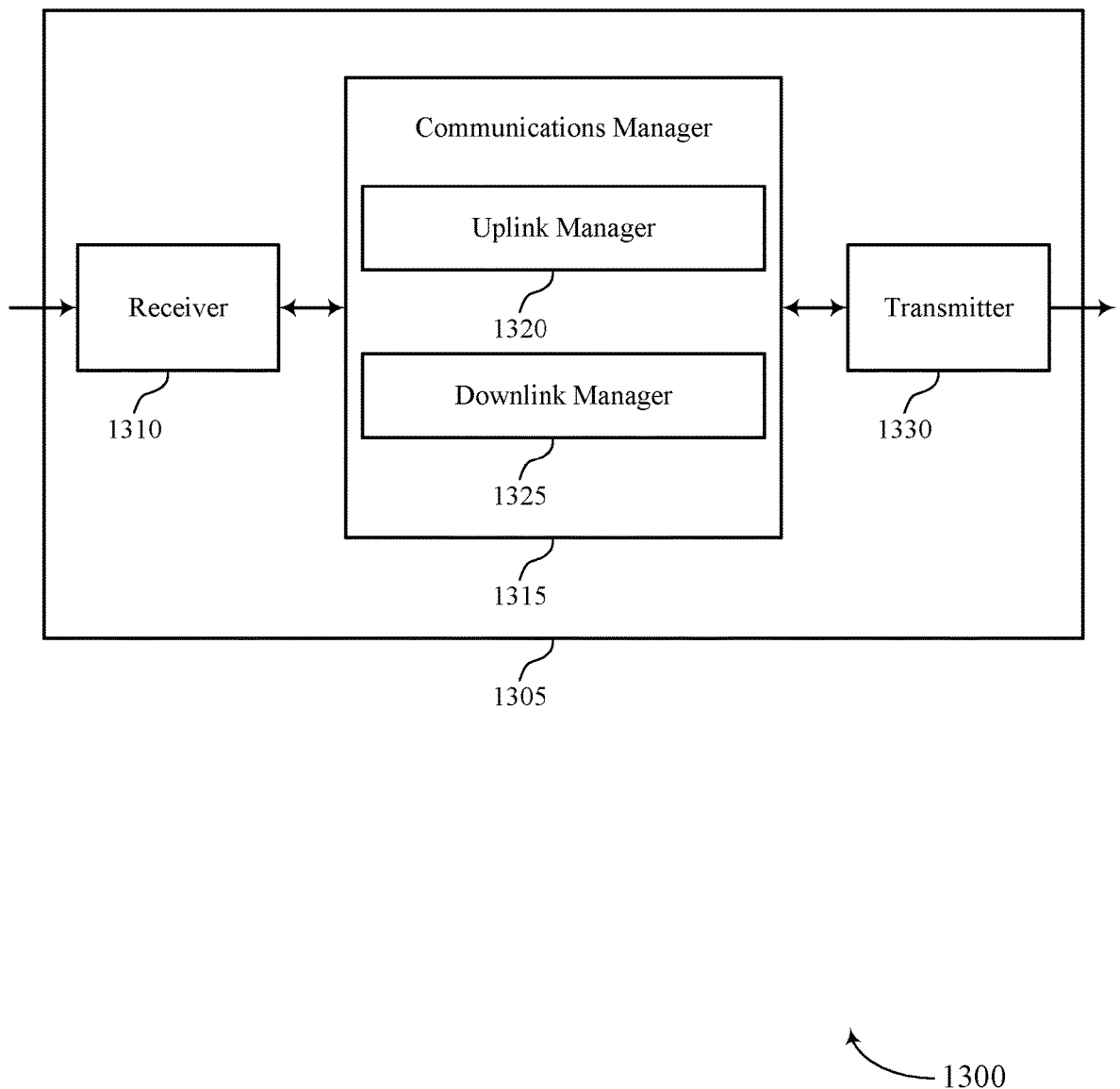

FIG. 13 shows a block diagram 1300 of a device 1305 that supports dynamic modification of sounding procedure configuration in accordance with aspects of the present disclosure. The device 1305 may be an example of aspects of a device 1205, or a base station 105 as described herein. The device 1305 may include a receiver 1310, a communications manager 1315, and a transmitter 1330. The device 1305 may also include a processor. Each of these components may be in communication with one another (e.g., via one or more buses).

The receiver 1310 may receive information such as packets, user data, or control information associated with various information channels (e.g., control channels, data channels, and information related to dynamic modification of sounding procedure configuration, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include an uplink manager 1320 and a downlink manager 1325. The communications manager 1315 may be an example of aspects of the communications manager 1510 described herein.

The uplink manager 1320 may receive, from a UE, an indication of a set of SRS transmission-antenna switching capabilities supported by the UE, the set of SRS transmission-antenna switching capabilities including at least a first SRS transmission-antenna switching capability and a second SRS transmission-antenna switching capability. The downlink manager 1325 may transmit a message to trigger the UE to switch from using a first configuration associated with the first SRS transmission-antenna switching capability to using a second configuration associated with the second SRS transmission-antenna switching capability.

The transmitter 1330 may transmit signals generated by other components of the device 1305. In some examples, the transmitter 1330 may be collocated with a receiver 1310 in a transceiver module. For example, the transmitter 1330 may be an example of aspects of the transceiver 1520 described with reference to FIG. 15. The transmitter 1330 may utilize a single antenna or a set of antennas.

Figure 14:
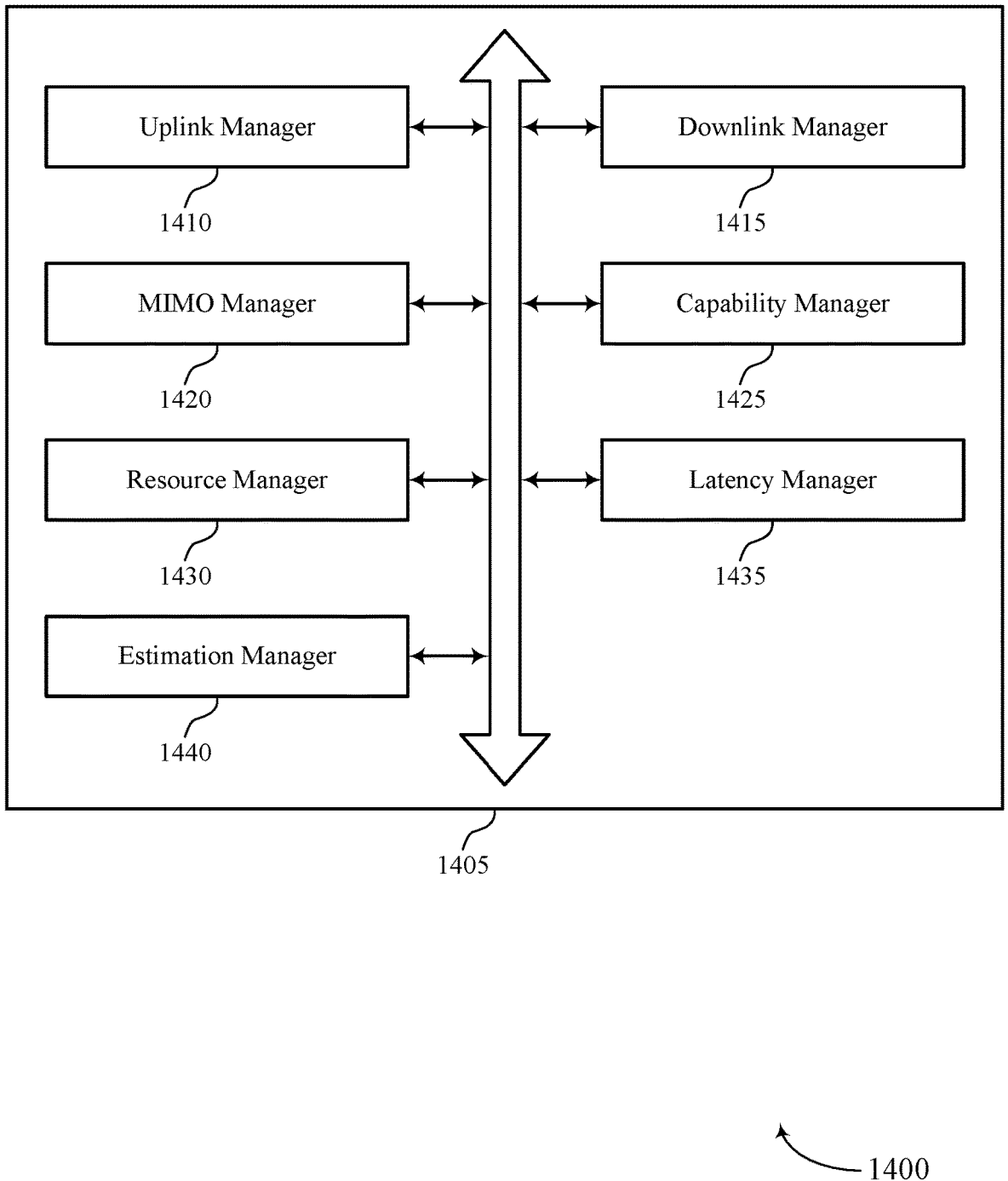
FIG. 14 shows a block diagram of a communications manager that supports dynamic modification of sounding procedure configuration in accordance with aspects of the present disclosure.

FIG. 14 shows a block diagram 1400 of a communications manager 1405 that supports dynamic modification of sounding procedure configuration in accordance with aspects of the present disclosure. The communications manager 1405 may be an example of aspects of a communications manager 1215, a communications manager 1315, or a communications manager 1510 described herein. The communications manager 1405 may include an uplink manager 1410, a downlink manager 1415, a MIMO manager 1420, a capability manager 1425, a resource manager 1430, a latency manager 1435, and an estimation manager 1440. Each of these modules may communicate, directly or indirectly, with one another (e.g., via one or more buses).

The uplink manager 1410 may receive, from a UE, an indication of a set of SRS transmission-antenna switching capabilities supported by the UE, the set of SRS transmission-antenna switching capabilities including at least a first SRS transmission-antenna switching capability and a second SRS transmission-antenna switching capability. The downlink manager 1415 may transmit a message to trigger the UE to switch from using a first configuration associated with the first SRS transmission-antenna switching capability to using a second configuration associated with the second SRS transmission-antenna switching capability.

The MIMO manager 1420 may determine to change a quantity of MIMO layers for downlink signaling from a first quantity to a second quantity. The capability manager 1425 may select the second SRS transmission-antenna switching capability based on the second maximum quantity of MIMO layers, where the message includes an indication of the change in the maximum quantity of MIMO layers. Selecting the second SRS transmission-antenna switching capability based on the maximum quantity of MIMO layers may reduce channel estimation processing at the base station (e.g., because the base station may receive fewer SRSs from fewer antennas).

In some examples, the capability manager 1425 may determine an association between each SRS transmission-antenna switching capability and a BWP configured for the UE. In some examples, the downlink manager 1415 may transmit an indication of the association for each SRS switching capability supported by the UE. In some cases, the message indicates a BWP configured for the UE.

In some examples, the uplink manager 1410 may receive a second message from the UE indicating that the second SRS transmission-antenna switching capability is preferred by the UE, where the message indicates the second SRS transmission-antenna switching capability.

The resource manager 1430 may determine at least one SRS resource set for each SRS transmission-antenna switching capability supported by the UE. In some examples, the downlink manager 1415 may transmit to the UE an indication of the at least one SRS resource set for each SRS transmission-antenna switching capability.

In some examples, the resource manager 1430 may determine at least one SRS resource set for the set of SRS transmission-antenna switching capabilities supported by the UE. In some examples, the downlink manager 1415 may transmit to the UE an indication of the at least one SRS resource set for the set of SRS transmission-antenna switching capabilities supported by the UE. In some examples, the downlink manager 1415 may transmit a rule for modifying the SRS resource set. In some examples, the downlink manager 1415 may transmit an indication of a set of ports and SRS resources to be used with the second SRS transmission-antenna switching capability.

The latency manager 1435 may identify a period of time the UE is to delay before performing an SRS procedure using a configuration associated with the second SRS transmission-antenna switching capability. In some examples, the downlink manager 1415 may transmit an indication of the period of time to the UE. In some examples, the uplink manager 1410 may receive an SRS from the UE after the period of time has elapsed.

In some examples, the latency manager 1435 may determine a first period of time the UE is to wait between receiving a trigger to switch from the first configuration to the second configuration and performing a sounding procedure using the second configuration. In some examples, the latency manager 1435 may determine a second period of time the UE is to wait between receiving a trigger to switch from the second configuration to the first configuration and performing a sounding procedure using the first configuration, where the second period of time is longer than the first period of time. In some examples, the downlink manager 1415 may transmit an indication of the first period of time and the second period of time to the UE. In some examples, the uplink manager 1410 may receive, in response to the message, an SRS from the UE after the first period of time has elapsed. In some examples, the downlink manager 1415 may transmit a second message to trigger the UE to switch from the second configuration to the first configuration. In some examples, the uplink manager 1410 may receive, in response to the second message, a second SRS from the UE after the second period of time has elapsed.

The estimation manager 1440 may estimate an uplink channel between the UE and the base station based on an SRS received from the UE and the second SRS transmission-antenna switching capability.

Figure 15:
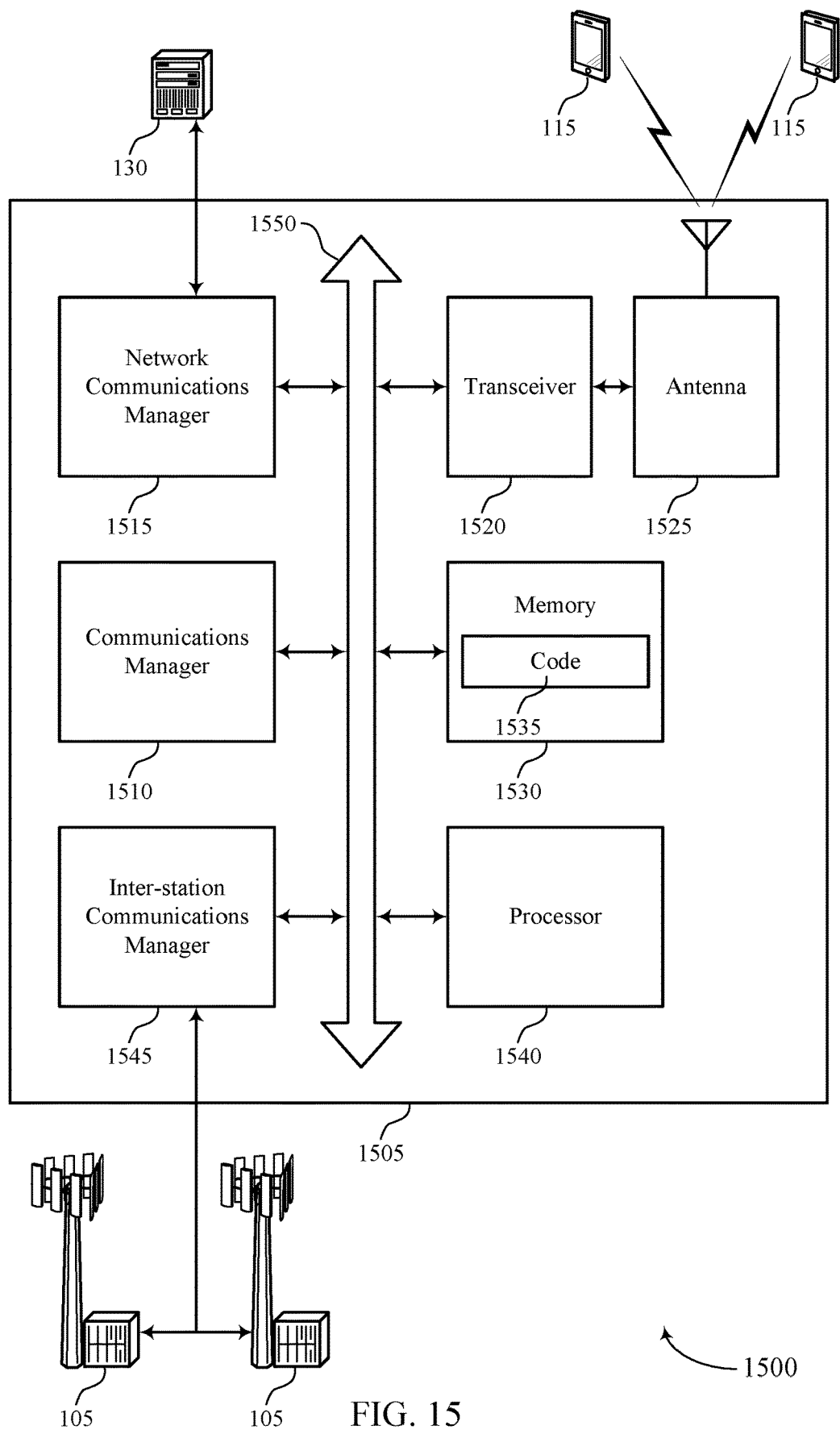
FIG. 15 shows a diagram of a system including a device that supports dynamic modification of sounding procedure configuration in accordance with aspects of the present disclosure.

FIG. 15 shows a diagram of a system 1500 including a device 1505 that supports dynamic modification of sounding procedure configuration in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may: receive, from a UE, an indication of a set of SRS transmission-antenna switching capabilities supported by the UE, the set of SRS transmission-antenna switching capabilities including at least a first SRS transmission-antenna switching capability and a second SRS transmission-antenna switching capability; and transmit a message to trigger the UE to switch from using a first configuration associated with the first SRS transmission-antenna switching capability to using a second configuration associated with the second SRS transmission-antenna switching capability.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting dynamic modification of sounding procedure configuration).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
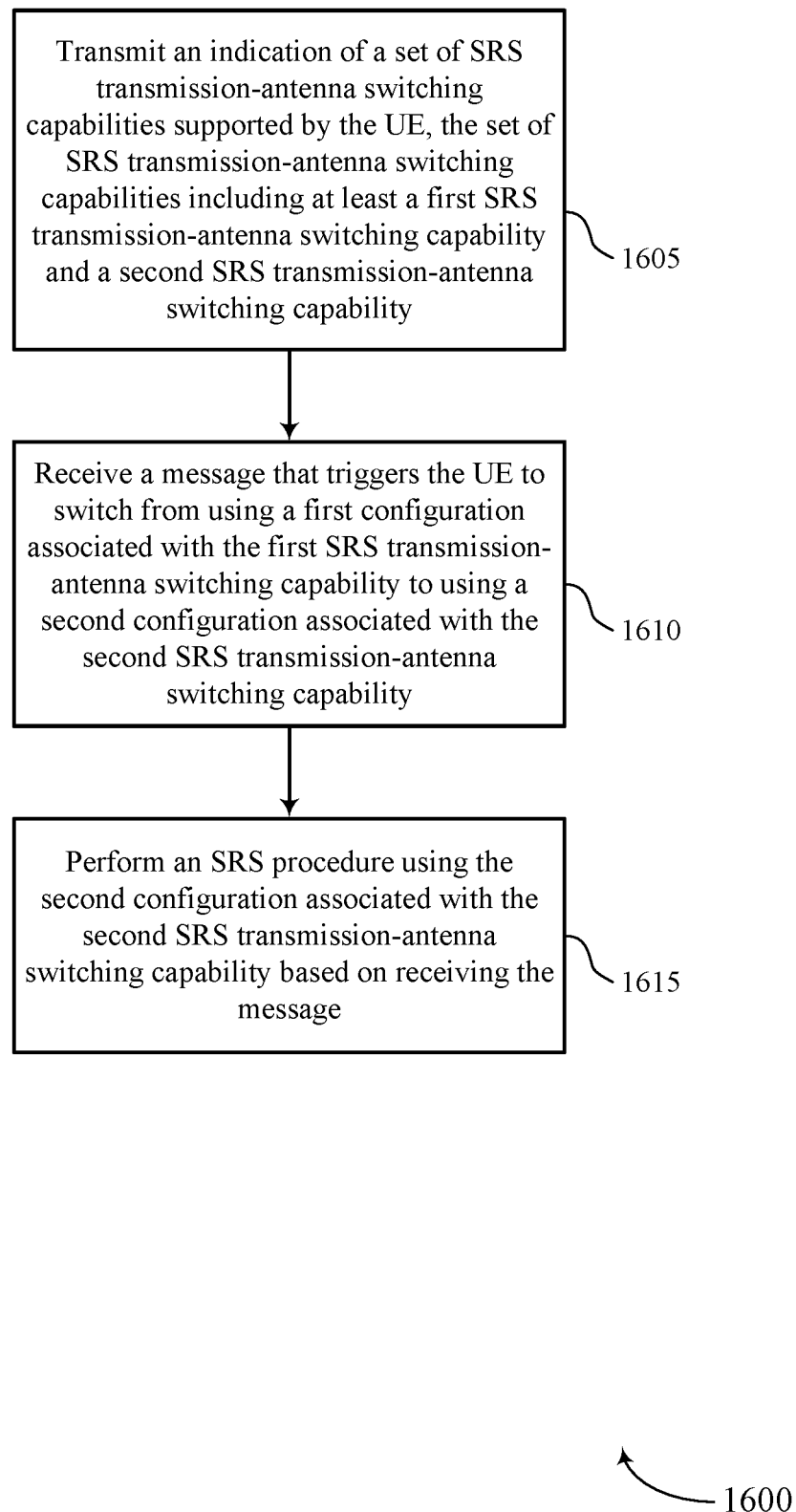
FIGS. 16 and 17 show flowcharts illustrating methods that support dynamic modification of sounding procedure configuration in accordance with aspects of the present disclosure.

FIG. 16 shows a flowchart illustrating a method 1600 that supports dynamic modification of sounding procedure configuration in accordance with aspects of the present disclosure. The operations of method 1600 may be implemented by a UE or its components as described herein. For example, the operations of method 1600 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1605, the UE may transmit an indication of a set of SRS transmission-antenna switching capabilities supported by the UE, the set of SRS transmission-antenna switching capabilities including at least a first SRS transmission-antenna switching capability and a second SRS transmission-antenna switching capability. The operations of 1605 may be performed according to the methods described herein. In some examples, aspects of the operations of 1605 may be performed by an uplink manager as described with reference to FIGS. 8 through 11.

At 1610, the UE may receive a message that triggers the UE to switch from using a first configuration associated with the first SRS transmission-antenna switching capability to using a second configuration associated with the second SRS transmission-antenna switching capability. The operations of 1610 may be performed according to the methods described herein. In some examples, aspects of the operations of 1610 may be performed by a downlink manager as described with reference to FIGS. 8 through 11.

At 1615, the UE may perform an SRS procedure using the second configuration associated with the second SRS transmission-antenna switching capability based on receiving the message. The operations of 1615 may be performed according to the methods described herein. In some examples, aspects of the operations of 1615 may be performed by a sounding manager as described with reference to FIGS. 8 through 11.

Figure 17:
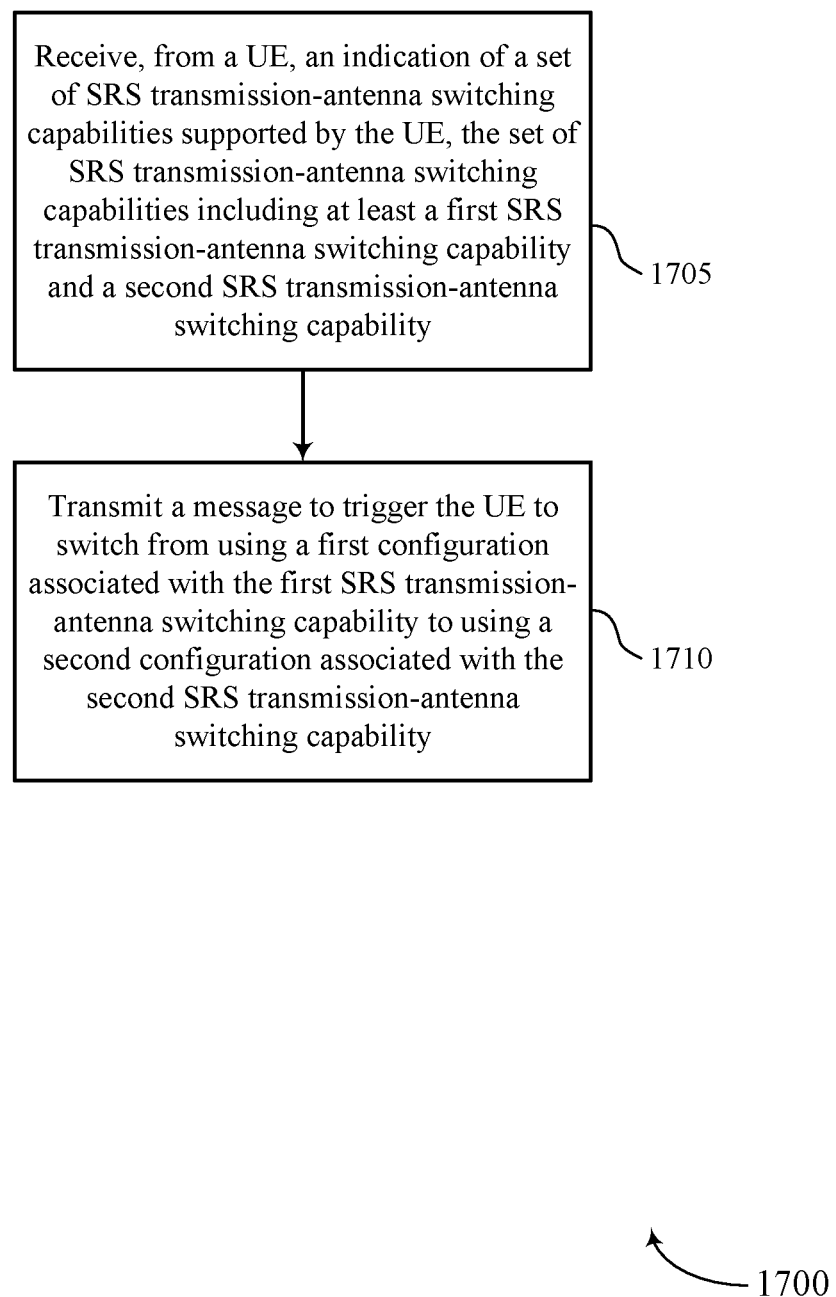

FIG. 17 shows a flowchart illustrating a method 1700 that supports dynamic modification of sounding procedure configuration in accordance with aspects of the present disclosure. The operations of method 1700 may be implemented by a base station 105 or its components as described herein. For example, the operations of method 1700 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 1705, the base station may receive, from a UE, an indication of a set of SRS transmission-antenna switching capabilities supported by the UE, the set of SRS transmission-antenna switching capabilities including at least a first SRS transmission-antenna switching capability and a second SRS transmission-antenna switching capability. The operations of 1705 may be performed according to the methods described herein. In some examples, aspects of the operations of 1705 may be performed by an uplink manager as described with reference to FIGS. 12 through 15.

At 1710, the base station may transmit a message to trigger the UE to switch from using a first configuration associated with the first SRS transmission-antenna switching capability to using a second configuration associated with the second SRS transmission-antenna switching capability. The operations of 1710 may be performed according to the methods described herein. In some examples, aspects of the operations of 1710 may be performed by a downlink manager as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    transmitting an indication of a plurality of sounding
        reference signal (SRS) transmission-antenna switching capabilities supported by the UE, the plurality of SRS transmission-antenna switching capabilities comprising at least a first SRS transmission-antenna switching capability and a second SRS transmission-antenna switching capability;

receiving an indication of an association between each of the plurality of SRS transmission-antenna switching capabilities and a respective bandwidth part (BWP) configured for the UE;

receiving a message that triggers the UE to switch from using a first configuration associated with the first SRS transmission-antenna switching capability to using a second configuration associated with the second SRS transmission-antenna switching capability, wherein switching from the first SRS transmission-antenna switching capability to the second SRS transmission-antenna switching capability comprises switching from a first quantity of antennas over which the UE can simultaneously transmit and a second quantity of antennas over which the UE can simultaneously receive to a third quantity of antennas over which the UE can simultaneously transmit and a fourth quantity of antennas over which the UE can simultaneously receive; and performing an SRS procedure using the second configuration associated with the second SRS transmission-antenna switching capability based at least in part on receiving the message.

2. The method of claim 1, further comprising:
receiving, in the message, an indication of a change in a maximum quantity of multiple-input multiple-output (MIMO) layers for downlink signaling, wherein a field in the message indicates the second SRS transmission-antenna switching capability.

3. The method of claim 1, wherein receiving the indication of the association between each of the plurality of SRS transmission-antenna switching capabilities and the respective BWP configured for the UE further comprises:
receiving the indication in response to transmitting the indication of the plurality of SRS transmission-antenna switching capabilities.

4. The method of claim 1, further comprising:
receiving, in the message, an indication that the UE is to change from using a first BWP to a second BWP, wherein the second SRS transmission-antenna switching capability is associated with the second BWP.

5. The method of claim 1, further comprising:
determining a preference at the UE for the second configuration associated with the second SRS transmission-antenna switching capability; and
transmitting an indication of the preference to a network device.

6. The method of claim 1, further comprising:
receiving, in response to transmitting the indication of the plurality of SRS transmission-antenna switching capabilities, an indication of at least a first SRS resource set that is associated with the first configuration and an indication of at least a second SRS resource set that is associated with the second configuration.

7. The method of claim 6, wherein the second SRS resource set comprises at least one SRS resource associated with at least one port, and wherein performing the SRS procedure comprises:
refraining from using one or more SRS resources of the at least one SRS resource or refraining from using one or more ports associated with the at least one SRS resource.

8. The method of claim 1, further comprising:
receiving, in response to transmitting the indication of the plurality of SRS transmission-antenna switching capabilities, an indication of an SRS resource set that is associated with the first configuration and the second configuration; and
modifying the SRS resource set based at least in part on switching from the first configuration to the second configuration.

9. The method of claim 8, wherein:
modifying the SRS resource set comprises changing a quantity of SRS resources associated with the SRS resource set or changing a quantity of ports associated with the SRS resources.

10. The method of claim 8, further comprising:
identifying a rule for modifying the SRS resource set, wherein modifying the SRS resource set is based at least in part on the identified rule.

11. The method of claim 8 further comprising:
receiving a rule for modifying the SRS resource set, wherein modifying the SRS resource set is based at least in part on the received rule.

12. The method of claim 1, further comprising:
changing from the first configuration to the second configuration based at least in part on the message.

13. The method of claim 12, further comprising:
receiving an indication of a period of time the UE is to delay before performing the SRS procedure using the second configuration; and
refraining from performing the SRS procedure using the second configuration until the period of time has elapsed.

14. The method of claim 12, wherein:
changing from the first configuration to the second configuration comprises at least one of changing an activation state of one or more ports, changing an activation state of one or more antennas, and changing one or more SRS resources used for the SRS procedure.

15. The method of claim 12, wherein the message is received from a network device, the method further comprising:
maintaining a connection with the network device while the UE changes from the first configuration to the second configuration.

16. The method of claim 1, further comprising:
receiving a first indication of a first period of time the UE is to wait between receiving a trigger to switch from the first configuration to the second configuration and performing a sounding procedure using the second configuration; and
receiving a second indication of a second period of time the UE is to wait between receiving a trigger to switch from the second configuration to the first configuration and performing a sounding procedure using the first configuration, wherein the second period of time is longer than the first period of time.

17. The method of claim 16, further comprising:
refraining from performing the SRS procedure using the second configuration until after the first period of time has elapsed;
receiving a second message that triggers the UE to switch from the second configuration to the first configuration; and
refraining from performing a second SRS procedure using the first configuration until after the second period of time has elapsed.

18. The method of claim 1, wherein the first configuration comprises a first quantity of activated antennas and the second configuration comprises a second quantity of activated antennas that is less than the first quantity of activated antennas.

19. The method of claim 1, wherein each SRS transmission-antenna switching capability indicates a first quantity of antennas over which the UE can simultaneously receive and a second quantity of antennas over which the UE can simultaneously transmit.

20. The method of claim 1, wherein the message comprises a downlink control information (DCI) message or a medium access control (MAC) control element (MAC-CE) message.

21. A method for wireless communication at a network device, comprising:
receiving, from a user equipment (UE), an indication of a plurality of sounding reference signal (SRS) transmission-antenna switching capabilities supported by the UE, the plurality of SRS transmission-antenna switching capabilities comprising at least a first SRS transmission-antenna switching capability and a second SRS transmission-antenna switching capability;
transmitting an indication of an association between each of the plurality of SRS transmission-antenna switching capabilities and a respective bandwidth part (BWP) configured for the UE; and
transmitting a message to trigger the UE to switch from using a first configuration associated with the first SRS transmission-antenna switching capability to using a second configuration associated with the second SRS transmission-antenna switching capability, wherein switching from the first SRS transmission-antenna switching capability to the second SRS transmission-antenna switching capability comprises switching from a first quantity of antennas over which the UE can simultaneously transmit and a second quantity of antennas over which the UE can simultaneously receive to a third quantity of antennas over which the UE can simultaneously transmit and a fourth quantity of antennas over which the UE can simultaneously receive.

22. The method of claim 21, further comprising:
determining the association between each of the plurality of SRS transmission-antenna switching capabilities and the respective bandwidth part (BWP) configured for the UE.

23. An apparatus for wireless communication at a user equipment (UE), comprising:
at least one processor;
at least one memory coupled with the at least one processor; and
instructions stored in the at least one memory and executable by the at least one processor to cause the apparatus to:
transmit an indication of a plurality of sounding reference signal (SRS) transmission-antenna switching capabilities supported by the UE, the plurality of SRS transmission-antenna switching capabilities comprising at least a first SRS transmission-antenna switching capability and a second SRS transmission-antenna switching capability;
receive an indication of an association between each of the plurality of SRS transmission-antenna switching capabilities and a respective bandwidth part (BWP) configured for the UE;
receive a message that triggers the UE to switch from using a first configuration associated with the first SRS transmission-antenna switching capability to using a second configuration associated with the second SRS transmission-antenna switching capability, wherein switching from the first SRS transmission-antenna switching capability to the second SRS transmission-antenna switching capability comprises switching from a first quantity of antennas over which the UE can simultaneously transmit and a second quantity of antennas over which the UE can simultaneously receive to a third quantity of antennas over which the UE can simultaneously transmit and a fourth quantity of antennas over which the UE can simultaneously receive; and
perform an SRS procedure using the second configuration associated with the second SRS transmission-antenna switching capability based at least in part on receiving the message.

24. The apparatus of claim 23, wherein the instructions are further executable by the at least one processor to cause the apparatus to:
receive, in the message, an indication of a change in a maximum quantity of multiple-input multiple-output (MIMO) layers for downlink signaling, wherein a field in the message indicates the second SRS transmission-antenna switching capability.

25. The apparatus of claim 23, wherein the instructions to receive the indication of the association between each of the plurality of SRS transmission-antenna switching capabilities and the respective BWP configured for the UE are further executable by the at least one processor to cause the apparatus to:
receive the indication in response to transmitting the indication of the plurality of SRS transmission-antenna switching capabilities.

26. The apparatus of claim 23, wherein the instructions are further executable by the at least one processor to cause the apparatus to:
receive, in the message, an indication that the UE is to change from using a first BWP to a second BWP, wherein the second SRS transmission-antenna switching capability is associated with the second BWP.

27. The apparatus of claim 23, wherein the instructions are further executable by the at least one processor to cause the apparatus to:
determine a preference at the UE for the second configuration associated with the second SRS transmission-antenna switching capability; and
transmit an indication of the preference to a network device.

28. The apparatus of claim 23, wherein the instructions are further executable by the at least one processor to cause the apparatus to:
receive, in response to transmitting the indication of the plurality of SRS transmission-antenna switching capabilities, an indication of a first SRS resource set that is associated with the first configuration and an indication of a second SRS resource set that is associated with the second configuration.

29. The apparatus of claim 28, wherein the second SRS resource set comprises at least one SRS resource associated with at least one port, and wherein the instructions are further executable by the at least one processor to cause the apparatus to:
refrain from using one or more SRS resources of the at least one SRS resource or refraining from using one or more ports associated with the at least one SRS resource.

30. An apparatus for wireless communication at a network device, comprising:
- at least one processor,
- at least one memory coupled with the at least one processor; and
- instructions stored in the at least one memory and executable by the at least one processor to cause the apparatus to:
  - receive, from a user equipment (UE), an indication of a plurality of sounding reference signal (SRS) transmission-antenna switching capabilities supported by the UE, the plurality of SRS transmission-antenna switching capabilities comprising at least a first SRS transmission-antenna switching capability and a second SRS transmission-antenna switching capability;
  - transmit an indication of an association between each of the plurality of SRS transmission-antenna switching capabilities and a respective bandwidth part (BWP) configured for the UE; and
  - transmit a message to trigger the UE to switch from using a first configuration associated with the first SRS transmission-antenna switching capability to using a second configuration associated with the second SRS transmission-antenna switching capability, wherein switching from the first SRS transmission-antenna switching capability to the second SRS transmission-antenna switching capability comprises switching from a first quantity of antennas over which the UE can simultaneously transmit and a second quantity of antennas over which the UE can simultaneously receive to a third quantity of antennas over which the UE can simultaneously transmit and a fourth quantity of antennas over which the UE can simultaneously receive.

* * * * *